US007030176B2

(12) United States Patent  
Nohr et al.

(10) Patent No.: US 7,030,176 B2
(45) Date of Patent: *Apr. 18, 2006

(54) RECORDING MEDIUM WITH NANOPARTICLES AND METHODS OF MAKING THE SAME

(75) Inventors: Ronald S. Nohr, Alpharetta, GA (US); John Gavin MacDonald, Decatur, GA (US); Bengt Gunnar Kronberg, Stockholm (SE)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 241 days.

This patent is subject to a terminal disclaimer.

(21) Appl. No.: 09/969,163

(22) Filed: Oct. 2, 2001

(65) Prior Publication Data

US 2003/0021983 A1    Jan. 30, 2003

Related U.S. Application Data

(60) Provisional application No. 60/237,142, filed on Oct. 2, 2000, provisional application No. 60/243,022, filed on Oct. 25, 2000.

(51) Int. Cl.
*C08K 9/00* (2006.01)
*C09D 11/10* (2006.01)

(52) U.S. Cl. ............... 523/201; 523/200; 523/206; 523/160

(58) Field of Classification Search ................ 523/160, 523/161, 201, 205, 206, 200
See application file for complete search history.

(56) References Cited

U.S. PATENT DOCUMENTS

| 4,187,194 | A | * | 2/1980 | Wellman et al. ....... 427/213.36 |
| 4,325,735 | A | | 4/1982 | Ohta et al. |
| 4,336,027 | A | | 6/1982 | Tussing |
| 4,487,855 | A | * | 12/1984 | Shih et al. ............. 523/201 |
| 4,585,484 | A | | 4/1986 | Haruta et al. |
| 4,701,128 | A | | 10/1987 | Fitzig et al. |
| 4,701,218 | A | | 10/1987 | Barker et al. |
| 4,710,525 | A | * | 12/1987 | Kraemer et al. ........ 523/201 |
| 4,726,844 | A | | 2/1988 | Greenwood |
| 4,767,459 | A | | 8/1988 | Greenwood et al. |
| 4,783,220 | A | | 11/1988 | Gamble et al. |
| 4,812,492 | A | | 3/1989 | Eckes et al. |
| 4,836,851 | A | | 6/1989 | Pawlowski et al. |
| 4,945,121 | A | * | 7/1990 | Micale et al. ........... 523/339 |
| 4,957,553 | A | | 9/1990 | Koike et al. |
| 4,963,189 | A | | 10/1990 | Hindagolla |
| 4,980,257 | A | * | 12/1990 | Anno et al. ............. 430/110.2 |
| 5,006,862 | A | | 4/1991 | Adamic |
| 5,017,227 | A | | 5/1991 | Koike et al. |
| 5,034,058 | A | | 7/1991 | Akiyama et al. |
| 5,062,893 | A | | 11/1991 | Adamic et al. |
| 5,064,694 | A | | 11/1991 | Gee |
| 5,067,980 | A | | 11/1991 | Koike et al. |
| 5,069,719 | A | | 12/1991 | Ono |
| 5,091,004 | A | | 2/1992 | Tabayashi et al. |
| 5,092,926 | A | | 3/1992 | Owatari |
| 5,098,474 | A | | 3/1992 | Pawlowski et al. |
| 5,100,470 | A | | 3/1992 | Hindagolla et al. |
| 5,133,803 | A | | 7/1992 | Moffatt |
| 5,135,832 | A | * | 8/1992 | Sacripante et al. ...... 430/106.2 |
| 5,145,518 | A | | 9/1992 | Winnik et al. |
| 5,151,128 | A | | 9/1992 | Fukushima et al. |
| 5,156,675 | A | | 10/1992 | Breton et al. |
| 5,160,535 | A | | 11/1992 | Cooke et al. |
| 5,190,581 | A | | 3/1993 | Fukushima et al. |
| 5,203,912 | A | | 4/1993 | Greenwood et al. |
| 5,220,346 | A | | 6/1993 | Carreira et al. |
| 5,221,332 | A | | 6/1993 | Kohlmeier |
| 5,223,026 | A | | 6/1993 | Schwarz, Jr. |
| 5,226,957 | A | | 7/1993 | Wickramanayake et al. |
| 5,230,732 | A | | 7/1993 | You et al. |
| 5,258,065 | A | | 11/1993 | Fujisawa |
| 5,269,840 | A | | 12/1993 | Morris et al. |
| 5,274,025 | A | | 12/1993 | Stockl et al. |
| 5,298,035 | A | | 3/1994 | Okamoto |
| 5,302,195 | A | | 4/1994 | Helbrecht et al. |
| 5,340,929 | A | | 8/1994 | Ono et al. |
| 5,344,489 | A | | 9/1994 | Matijevic et al. ........... 106/442 |
| 5,344,872 | A | | 9/1994 | Debord et al. |
| 5,370,730 | A | | 12/1994 | Gregory et al. |
| 5,382,283 | A | | 1/1995 | Yui et al. |

(Continued)

FOREIGN PATENT DOCUMENTS

DE    198 21 665 A1    12/1998

(Continued)

OTHER PUBLICATIONS

Machine Translation of JP 08110654 A (1996).*

(Continued)

*Primary Examiner*—Callie Shosho
(74) *Attorney, Agent, or Firm*—Schwegman, Lundberg, Woessner & Kluth, P.A.

(57) ABSTRACT

The present invention provides recording media comprising nanoparticles, methods of stabilizing recording media against electromagnetic radiation (including ultraviolet radiation and radiation in the visible wavelength range), methods for enhancing the substrate independent durability performance of recording media, and methods for color density and hue control. The recording media deliver improved color, better color density control, improved printability, enhanced durability, and increased lightfastness, but also are capable of being printed on all substrates including woven and non-woven fabrics and paper products, without special treatment or other limitations.

33 Claims, 3 Drawing Sheets

U.S. PATENT DOCUMENTS

| | | | |
|---|---|---|---|
| 5,407,770 A * | 4/1995 | Tomita et al. | 430/110.2 |
| 5,431,723 A | 7/1995 | Bermes et al. | |
| 5,439,514 A | 8/1995 | Kashiwazaki et al. | |
| 5,441,561 A | 8/1995 | Chujo et al. | |
| 5,484,475 A | 1/1996 | Breton et al. | |
| 5,512,095 A | 4/1996 | Sens et al. | |
| 5,531,817 A | 7/1996 | Shields et al. | |
| 5,538,548 A | 7/1996 | Yamazaki | |
| 5,565,022 A | 10/1996 | Wickramanayake | |
| 5,605,566 A | 2/1997 | Yui et al. | |
| 5,626,654 A | 5/1997 | Breton et al. | |
| 5,626,655 A | 5/1997 | Pawlowski et al. | |
| 5,633,109 A | 5/1997 | Jennings et al. | |
| 5,656,072 A | 8/1997 | Kato et al. | |
| 5,661,197 A | 8/1997 | Villiger et al. | |
| 5,667,572 A | 9/1997 | Taniguchi et al. | |
| 5,679,138 A | 10/1997 | Bishop et al. | |
| 5,679,724 A | 10/1997 | Sacripante et al. | |
| 5,684,063 A | 11/1997 | Patel et al. | |
| 5,693,126 A | 12/1997 | Ito | |
| 5,698,616 A * | 12/1997 | Baker et al. | 523/201 |
| 5,705,222 A * | 1/1998 | Somasundaran et al. | 427/220 |
| 5,725,643 A | 3/1998 | Higashiyama | |
| 5,749,951 A | 5/1998 | Yoshiike et al. | |
| 5,753,026 A | 5/1998 | Kuntz et al. | |
| 5,756,561 A | 5/1998 | Wang et al. | |
| 5,763,130 A * | 6/1998 | Sasaki et al. | 430/110.2 |
| 5,769,931 A | 6/1998 | Wang et al. | |
| 5,777,639 A | 7/1998 | Kageyama et al. | |
| 5,785,745 A | 7/1998 | Lauw et al. | |
| 5,788,749 A | 8/1998 | Breton et al. | |
| 5,788,753 A | 8/1998 | Pawlowski et al. | |
| 5,810,917 A | 9/1998 | Yamazaki et al. | |
| 5,814,685 A | 9/1998 | Satake et al. | |
| 5,833,744 A | 11/1998 | Breton et al. | |
| 5,843,509 A | 12/1998 | Calvo Salve et al. | |
| 5,852,073 A | 12/1998 | Villiger et al. | |
| 5,855,660 A | 1/1999 | Bujard et al. | |
| 5,868,823 A | 2/1999 | Yamazaki et al. | |
| 5,877,235 A | 3/1999 | Sakuma et al. | 523/161 |
| 5,879,439 A | 3/1999 | Nagai et al. | |
| 5,880,176 A | 3/1999 | Kamoto et al. | |
| 5,882,391 A | 3/1999 | Gregory et al. | |
| 5,882,392 A | 3/1999 | Gregory et al. | |
| 5,888,286 A | 3/1999 | Gregory et al. | |
| 5,891,230 A | 4/1999 | Gregory et al. | |
| 5,891,232 A | 4/1999 | Moffatt et al. | |
| 5,891,934 A | 4/1999 | Moffatt et al. | |
| 5,911,816 A | 6/1999 | Gore | |
| 5,916,596 A | 6/1999 | Desai et al. | |
| 5,928,416 A | 7/1999 | Gundlach et al. | |
| 5,928,419 A | 7/1999 | Uemura et al. | |
| 5,935,309 A | 8/1999 | Moffatt et al. | |
| 5,935,310 A | 8/1999 | Engel et al. | |
| 5,936,008 A * | 8/1999 | Jones et al. | 523/161 |
| 5,942,027 A | 8/1999 | Ikai et al. | |
| 5,944,883 A | 8/1999 | Saibara et al. | |
| 5,948,155 A | 9/1999 | Yui et al. | |
| 5,955,515 A * | 9/1999 | Kimura et al. | 523/161 |
| 5,958,998 A | 9/1999 | Foucher et al. | |
| 5,962,566 A | 10/1999 | Grandfils et al. | |
| 5,964,930 A | 10/1999 | Saibara et al. | |
| 5,968,244 A | 10/1999 | Ueda et al. | |
| 5,972,389 A | 10/1999 | Shell et al. | |
| 5,973,025 A | 10/1999 | Nigam et al. | |
| 5,973,027 A | 10/1999 | Howald et al. | |
| 5,980,623 A | 11/1999 | Hiraoka et al. | |
| 5,981,623 A | 11/1999 | McCain et al. | |
| 5,993,527 A | 11/1999 | Tochihara et al. | |
| 5,993,856 A | 11/1999 | Ragavan et al. | |
| 6,015,454 A | 1/2000 | Lacroix et al. | |
| 6,015,455 A | 1/2000 | Yano et al. | |
| 6,019,827 A | 2/2000 | Wickramanayake et al. | |
| 6,024,785 A | 2/2000 | Morimoto | |
| 6,024,786 A | 2/2000 | Gore | |
| 6,025,412 A | 2/2000 | Sacripante et al. | |
| 6,031,024 A | 2/2000 | Uraki et al. | |
| 6,033,463 A | 3/2000 | Yui et al. | |
| 6,034,154 A | 3/2000 | Kase et al. | |
| 6,037,391 A | 3/2000 | Iida | |
| 6,045,606 A | 4/2000 | Matzinger | |
| 6,048,390 A | 4/2000 | Yano et al. | |
| 6,051,057 A | 4/2000 | Yatake et al. | |
| 6,057,384 A * | 5/2000 | Nguyen et al. | 523/160 |
| 6,090,193 A | 7/2000 | Nigam et al. | |
| 6,099,627 A | 8/2000 | Saibara et al. | |
| 6,110,266 A | 8/2000 | Gonzalez-Blanco et al. | |
| 6,113,680 A | 9/2000 | Aoyama et al. | |
| 6,121,365 A | 9/2000 | Saibara et al. | |
| 6,129,786 A | 10/2000 | Camara et al. | |
| 6,140,390 A | 10/2000 | Bugner et al. | |
| 6,147,139 A | 11/2000 | Shaw-Klein et al. | |
| 6,149,719 A | 11/2000 | Houle | |
| 6,153,001 A | 11/2000 | Suzuki et al. | |
| 6,159,649 A | 12/2000 | Macholdt et al. | |
| 6,165,440 A | 12/2000 | Esenaliev | |
| 6,171,382 B1 | 1/2001 | Stubbe et al. | |
| 6,602,932 B1 * | 8/2003 | Feldheim et al. | 523/201 |
| 2001/0019770 A1 * | 9/2001 | Eian et al. | 428/402.2 |
| 2003/0021983 A1 | 1/2003 | Nohr et al. | |
| 2003/0219384 A1 * | 11/2003 | Donath et al. | 424/9.6 |

FOREIGN PATENT DOCUMENTS

| | | |
|---|---|---|
| EP | 0 318 612 A1 | 6/1989 |
| EP | 0318612 B1 | 10/1991 |
| EP | 0 861 880 A1 | 9/1998 |
| EP | 0 972 563 A1 | 1/2000 |
| JP | 56 143 272 A | 11/1981 |
| JP | 63 105 078 A | 5/1988 |
| JP | 08110654 A * | 4/1996 |
| JP | 08 259 868 A | 10/1996 |
| JP | 2000 129 179 A | 5/2000 |
| WO | 98 14524 A1 | 4/1998 |
| WO | 99 47252 A2 | 3/1999 |
| WO | 99 47253 A1 | 3/1999 |
| WO | 00 03797 A1 | 7/1999 |
| WO | WO 99/63006 | 12/1999 |
| WO | 00 66090 A1 | 11/2000 |
| WO | WO 01/06054 A1 | 1/2001 |
| WO | WO 02/02347 A1 | 1/2002 |
| WO | PCT/US01/42433 | 11/2002 |

OTHER PUBLICATIONS

Santra, et al., "Development of novel eye-doped silica nanoparticles for biomarker application," Journal of Biomedical Optics, Apr. 2001, pp. 160-166, vol. 6, No. 2.

Buchhammer, et al., "Nanoparticles based on polyelectrolyte complexes: effect of structure and net change on the sorption capability for solved organic molecules," Colloid and Polymer Science, Sep. 2000, pp. 841-847, vol. 278, No. 9.

Makarova, et al., "Adsorption and Encapsulation of Fluorescent Probe in Nanoparticles," The Journal of Physical Chemistry, Oct. 1999, pp. 9080-9084, vol. 103, No. 43.

Maskos, et al., "Amphiphilic Polyorganosiloxane Nanospheres: Encapsulation of Hydrophilic Dyes," abstract, 221st American Chemical Society Meeting, San Diego, CA, Apr. 1-5, 2001.

Caruso et al., "ElectrostaticSelf-Assembly of Silica Nanoparticle-Polyelectrolyte Multilayers on Polystyrene Latex Particles", Journal of the American Chemical Society, 1998, p. 8523-8524, vol. 120.

Cooper et al., "Formation of Polypeptide-Dye Multilayers by an Electrostatic Self-Assembly Technique", Langmuir, 1995, p. 2713-*2718, vol. 11.

Icinoze et al., Layer-by Layer Assembly of Aqueous Bilayer Membrances on Changes Surfaces, Chemistry Letters, 1996, p. 257-258.

Kotov, N.A., "Layer-by-Layer Self-Assembly: The Contribution of Hydrophobic Interactions", NanoStructured Materials, 1999, p. 789-796, vol. 12.

* cited by examiner

RECORDING MEDIUM WITH NANOPARTICLES AND METHODS OF MAKING THE SAME

CROSS REFERENCE TO RELATED APPLICATION

This application claims priority to Provisional Applications Ser. No. 60/237,142, filed Oct. 2, 2000, and Ser. No. 60/243,022, filed Oct. 25, 2000, the entirety of which are incorporated herein by reference.

TECHNICAL FIELD

The present invention relates to recording media, ink compositions, methods of making recording media and inks, nanoparticles, and methods of making nanoparticles.

BACKGROUND OF THE INVENTION

Typically, recording media used in printing processes degrade when exposed to chemical or physical processes involving the environment or involving the printing process itself. A recording medium is a composition capable of providing an indicator, a surface modification, or an aesthetic attribute on a substrate. Recording media can include, for example, inks used in printing on paper and textiles, surface modifiers that provide gloss or texture, colorless compositions that change to color when irradiated with UV or visible radiation, various coatings for surfaces, and the like.

Photodegradation occurs when the recording medium fades when exposed to electromagnetic radiation such as sunlight or artificial light and the like. These degradation mechanisms include photooxidation or -reduction of the recording medium depending upon the environmental conditions experienced. Product analysis of stable photoproducts and intermediates in various recording media has revealed several important modes of photodegradation. These include electron ejection from the recording medium, reaction with ground-state or excited singlet state oxygen, bond cleavage to form various products, reduction to form the colorless leuco dyes, and electron or hydrogen atom abstraction to form radical intermediates.

Various environmental factors such as temperature, humidity, gaseous reactants including $O_2$, $O_3$, $SO_2$, and $NO_2$, and water soluble nonvolatile photodegradation products have been shown to influence fading of colorants. The factors that effect fading appear to exhibit a certain amount of interdependence. It is due to this complex behavior that observations for the fading of a particular colorant on a particular substrate cannot be applied to colorants and substrates in general.

The ability of a light source to cause photodegradation in a recording medium is also dependent upon the spectral distribution of the light source, that is the proportion of radiation of wavelengths most effective in causing a change in the recording medium and the quantum yield of degradation as a function of wavelength. On the basis of photochemical principles, it might be expected that light of higher energy (short wavelengths) would be more effective at causing fading than light of lower energy (long wavelengths). Studies have revealed that this is not always the case. Over 100 colorants of different classes were studied and found that generally the most unstable were faded more efficiently by visible light while those of higher lightfastness were degraded mainly by ultraviolet light (McLaren, K., *J. Soc. Dyers Colour*, 1956, 72, 86).

In addition, the influence of a substrate on recording medium stability can be extremely important. Due to the complex behavior of recording media, the mechanisms causing fading of a particular recording medium on a particular substrate cannot be applied to recording media and substrates in general. Fading may be retarded or promoted by a chemical group within the substrate. Such a group can be a ground-state species or an excited-state species. The porosity of the substrate is also an important factor in recording medium stability. For example, a high porosity can promote fading by facilitating penetration of moisture and gaseous reactants into the substrate. A substrate may also act as a protective agent by screening the recording medium from light of wavelengths capable of causing degradation.

The purity of the substrate is also an important consideration whenever the photochemistry of dyed technical polymers is considered. For example, technical-grade cotton, viscose rayon, polyethylene, polypropylene, and polyisoprene are known to contain carbonyl group impurities. These impurities absorb light of wavelengths greater than 300 nm, which are present in sunlight, and so, excitation of these impurities may lead to reactive species capable of causing fading (van Beek, H. C. A., *Col. Res. Appl.*, 1983, 8(3), 176).

Under conditions of constant temperature it has been observed that an increase in the relative humidity of the atmosphere increases fading of a colorant for a variety of colorant-substrate systems (e.g., McLaren, K., *J. Soc. Dyers Colour*, 1956, 72, 527). For example, as the relative humidity of the atmosphere increases, a fiber may swell because the moisture content of the fiber increases. This aids diffusion of gaseous reactants through the substrate structure.

In addition to fading, recording media tend to bleed when applied to certain substrates, especially textiles. Accordingly, a recording medium capable of demonstrating enhanced stability and light fastness when applied to any type of substrate is desired.

There is also a need for a recording medium that not only provides increased stability and lightfastness, but also one that is capable of being printed on substrates without special treatment or other limitations. In addition, a superior textile recording medium with substrate independent durability performance is needed.

What is also desired is a recording medium that not only provides increased stability and lightfastness, but also one in which color intensity and hue are capable of being finely manipulated.

There also exists a need for methods and compositions which are capable of stabilizing a wide variety of recording media from the effects of both sunlight and artificial light. In addition, methods and compositions are needed that can stabilize a recording medium from the deleterious effects of humidity and oxygen and other gaseous reactants such as $O_3$, $SO_2$, and $NO_2$.

SUMMARY OF THE INVENTION

The present invention is directed to providing, among other things, new recording media comprising nanoparticles, methods for stabilizing recording media against photodecomposition and environmental degradation, methods for finely manipulating color intensity and hue, and processes for printing on varied substrates. This invention also provides the new nanoparticles themselves, methods of making these nanoparticles, and methods of making nanoparticle based recording media and inks.

In general, the present invention is directed to recording media comprising particles or nanoparticles with a polymeric core. These particles or nanoparticles are formed in an oil/water system by high shear emulsification. The polymeric core can be used as a surface upon which to bind colorants, functional additives, charged polymers, and colorant-charged polymer layers. The polymeric core itself and the charged polymer layers can incorporate any number of functional agents, including but not limited to, colorants, colorant stabilizers, functional additives, and any combinations thereof. The nanoparticle can further comprise a protective coating such a charged polymer or crosslinked polymer. The ability to incorporate colorants into the polymeric core, as well as in the sequential layers of charged polymers, provides the ability to finely adjust the color and other properties of the recording medium.

Accordingly, one aspect of the present invention is multiple layers of charged polymer-colorant (or polyelectrolyte-colorant) being assembled on the surface of a nanoparticle core. Because these layers are typically characterized by alternating charges, layer integrity is maintained by coulombic forces, as well as by van der Waals and other physical and chemical forces. Different colorants may be used in sequential charged polymer-colorant layers to afford unusual or hard-to-obtain colors. Additionally, a charged polymer-colorant layer may alternate with charged polymer void of colorant, in order to protect the colorant below the void charged polymer layers, or to manipulate particle charge. Charged polymer layers may also contain "functional additives" such as UV or visible radiation filters or screening agents to protect dyes from harmful radiation, leuco dyes or colorless predyes that develop color upon irradiation, or reactive species generators that react to fade colors upon irradiation. A final outside layer, comprised of a protective stratum of transparent charged polymer, may optionally be added to the nanoparticle. When assembled in this fashion, the final charge of this protective outer layer (zeta potential) is employed to adhere the dye particle to the fabric surface during printing. Thus, by matching the nanoparticle charge to the opposite charge of the printing substrate or textile coating, strong coulombic attraction can be achieved, in addition to van der Waals and other physical and chemical forces.

The present invention is also directed to recording media containing the above-described nanoparticles. The recording media can be applied to any substrate and can be used, for example, to impart a color to a substrate, provide a functional coating on a substrate, provide lightfastness, provide a texture, gloss or finish to a substrate, and for other uses to modify, stabilize, or protect a substrate. For example, one aspect of the present invention is that, a colorant composition comprising the nanoparticles described above, a liquid medium and a pre-polymer is coated onto a substrate and subsequently exposed to radiation to fix the nanoparticle to the substrate via the polymerization of the pre-polymer. The present invention includes methods for enhancing the substrate-independent durability performance of recording media.

The present invention is further directed to a method of stabilizing a colorant by assembling multiple layers of charged polymer-colorant and colorless charged polymer on a nanoparticle surface. In one aspect of the present invention, one or more colorant stabilizers are also incorporated in the charged polymer layers, thereby providing multiple levels of colorant protection from photodegradation mechanisms.

The present invention includes methods to stabilize recording media against environmental degradation. The present invention also includes methods to stabilize recording media against photodecomposition.

The present invention is also directed to nanoparticles and methods of making these nanoparticles.

The present invention also provides a series of methods and compositions for more finely manipulating color density and hue on various substrates.

The present invention is further directed to methods of making recording media comprising particles.

The present invention is also directed to printing processes using recording media comprising nanoparticles.

These and other features and advantages of the present invention will become apparent after a review of the following detailed description.

DETAILED DESCRIPTION OF THE INVENTION

Figure 1:
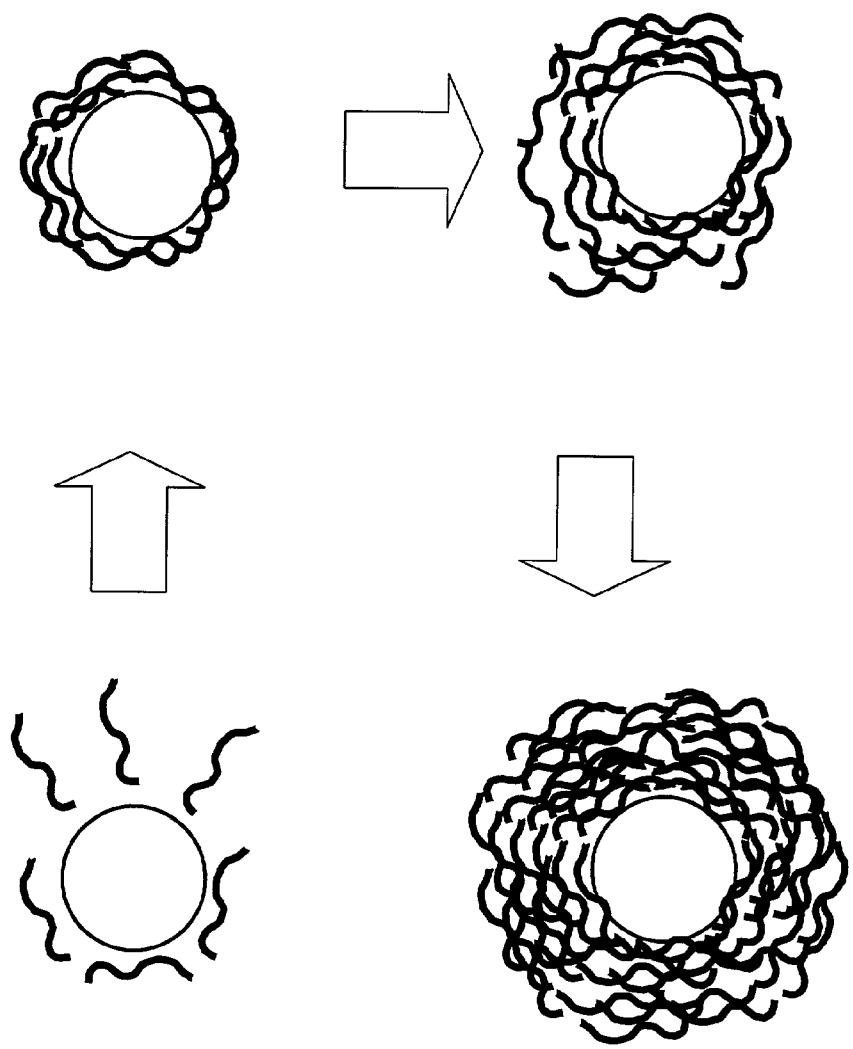
FIG. 1 illustrates one aspect of the present invention, depicting the formation of a nanoparticle by adding multiple layers of charged polymer-colorant or alternating layers of charged polymer-colorant/colorless charged polymer onto a nanoparticle template. The size of the resulting colored nanoparticle will increase accordingly, as shown.

The present invention is directed to recording media containing new types of nanoparticles. The use of nanoparticles in the recording media of the present invention, among other things, intensifies the colors and stabilizes the colorants when they are exposed to light and other potentially degrading conditions. The present invention is useful for printing processes on all substrates. The recording media can be applied to any substrate to impart a color to the substrate, coat the surface of the substrate, or provide texture or aesthetic factors to the substrate. The recording media of the present invention typically comprise nanoparticles and a liquid medium. However, the present invention also encompasses a pre-polymer/nanoparticle mixture that is coated onto a substrate and subsequently exposed to radiation or heat to fix the nanoparticle to the substrate by polymerization of the pre-polymer. The recording media of the present invention can also be a polymer coating of a heat transfer product, such as that used for transferring graphic images onto clothing.

The recording media of the present invention can be very effective in ink jet inks. Recording media used in ink jet printers are described in U.S. Pat. No. 5,681,380, assigned to Kimberly-Clark Worldwide, Inc., which is incorporated herein by reference in its entirety. Additionally, the recording media of the present invention are effective in coatings for paper products and textiles.

In one aspect of the present invention, the nanoparticle of the recording medium has multiple layers of charged polymer-colorant and colorless charged polymer or "void" charged polymer (without a colorant) layers assembled on the polymeric nanoparticle core surface. Another aspect of the present invention is multiple, alternating layers of charged polymer-colorant being assembled on the polymeric nanoparticle core surface without void charged polymer layers between the charged polymer-colorant layers. In one embodiment, the nanoparticle is coated with colorant or other functional additive prior to any coating comprising a charged polymer. The nanoparticle core itself comprises a polymer that can include a colorant and/or functional additive. In one aspect, different colorants may be used in sequential charged polymer-colorant layers and/or within the core to afford tailored colors. Charged polymer layers may also contain "functional additives" such as UV or visible radiation screening agents or filters to protect dyes from harmful radiation, leuco dyes or colorless predyes that develop color upon irradiation, or reactive species generators that react to fade colors upon irradiation. Because, in one aspect, layers are characterized by alternating or different charges, the integrity of the layers is maintained by coulombic forces, as well as by van der Waals and other physical and chemical forces. Changes in the zeta potential after each layer confirms that substantially uniform and substantially complete coating has been achieved. Charged polymers that are useful in the present invention include, but are not limited to, the polycations polyethylenimine, permethylated, perbromide (MW=1800, Polysciences, Warrington, Pa.), and poly(2-methacryloxyethyl trimethylammonium bromide). Examples of polyanions used herein are poly(vinylsulfonic acid, sodium salt) MW=2000, Polysciences, Warrington, Pa.) and poly(styrene sulfonic acid, sodium salt).

The present invention is also directed to recording media comprising nanoparticles of less than or about 1000 nanometers (nm) comprising a polymeric core. The polymeric core can have at least one colorant disposed within, and typically dispersed substantially throughout, the polymeric material. Optionally, the core may be coated with one or more colorant layers, colorless charged polymer layers, charged polymer-colorant layers, or any combination thereof disposed on its surface. Moreover, the nanoparticle may further comprise at least one surface modifying layer disposed on and substantially covering the polymeric material. The colorants of the core and charged polymer layers can be the same or different. Likewise, the colorant of the charged polymer layers can differ in alternating layers, or the charged polymer-colorant layers and the void charged polymer layers can alternate in any fashion. By carefully choosing the colorants in each layer in the manner known to one of ordinary skill in the art, fine color control can be achieved. The nanoparticle can optionally comprise an outer crosslinked protective coating that encapsulates the layers below. Of course, the recording media can comprise any suitable carrier for the nanoparticles.

This layer-by-layer self-assembly of alternately-charged and/or differently-charged, charged polymer-colorant polymers (including, in some embodiments, colorless charged polymer) bound to the polymeric nanoparticle core provides the resulting recording medium or ink with enhanced light fastness, unlimited use of water soluble dyes (containing charge centers), control of color density, and strong fabric bonding via coulombic, van der Waals, and other forces, leading to enhanced durability. In addition, control of color density may also be achieved by adjusting reaction times between the polymeric nanoparticle substrate and the charged polymer-colorant where the extent of coating the particle dictates color density.

One aspect of the present invention is directed to a recording medium comprising a polymer core of an organic polymer that comprises a colorant disposed within, and typically dispersed substantially throughout, the polymer up to about 30% by weight. A solution of dye and polymer in a solvent is subjected to high shear emulsification in an oil/water system, resulting in nanoparticle formation. The resultant nanoparticles are then coated with charged polymer layers, in which some of the charged polymer can have another colorant complexed with it. By employing a nanoparticle core that already comprises a colorant, high color intensities may be achieved by coating the resultant nanoparticles with multiple charged polymer layers comprising another colorant complexed therewith. Additionally, the resultant polymer-colorant nanoparticles may be coated with colorant, charged polymer layers, colorant-charged polymer layers comprising a different or the same colorant to achieve fine control over color hue, intensity and stability. The nanoparticles are combined with a suitable carrier to form a recording medium such as an ink.

The polymeric core can comprise any suitable organic polymer, an inorganic polymer, a semiorganic polymer (primarily organic backbone with pendant inorganic groups), a semi-inorganic polymer (primarily inorganic backbone with pendant organic groups), an organometallic polymer, or combinations thereof, capable of forming a particle and having a zeta potential. Organic polymers suitable for the polymeric core include, but are not limited to, polymer particles, such as particles of polyacetals, polyacetaldehydes, polyacetates, polyacetylenes, polyacrylamides, polyamideimides, polyacrylates, polyacrylic acids, polyacrylonitriles, poly(melamine formaldehyde), polyalkylsilynes, poly(amic acids), polyamides, polycaproic acids, polyanilines, polyaramides, polyarylates, polybenzimidazoles, polybenzothiazones, polybenzoxazoles, polyalkadienes (such as polybutadienes or polypentadienes), polybutenes, poly(alkylene terphahalates), poly(caprolactams), poly(caprolactones), polycarbonates, polycarbosilanes, polychloroprenes, polyalkylenes (such as polyethylenes, polypropylenes, and polybutenes), polyalkylene oxides (such as polyethylene oxides or poly-p-phenyleneoxides), polyalkylenesulfides (such as polyethylene sulfides), polysilanes, polysiloxanes, polysilylenes, polyepichlorohydrins, polyesteramides, polyesters, polyimides, polyethers, polyalkylene glycols, polyglycols, polyether glycols, polyetherimides, polyketones, polysulfones, polyethyleneimines, polyimidosulfides, polyketones, polyisoprenes, polyphosphates, polynitriles, polystyrenes, polyurethanes, polytriazoles, polyterpenes, polynitrides, polysulfides, mixtures thereof, and copolymers thereof. Preferred organic polymers can include but are not limited to polyamines such as poly(melamine formaldehyde), polyamides, polyesters, poly-isoprenes, poly-butadienes, poly(acrylonitrile-cobutadiene), poly(acrilonitrile-co-butadiene-co-styrene), poly(α- methylstyrene), poly(vinyl acetate), copolymers thereof, combinations thereof, and crystallites of organic compounds. Most useful are polymers capable of forming nanoparticles of 50 nm or less.

The discussion is directed to particles of less than about 1000 nanometers (nm), however, the same principles can apply to a particle having a size of greater than 1000 nm. Before coating with charged polymer layer, the polymeric core can have an average particle size of less than about 100 nm, typically less than about 40 nm. In accordance with the present invention, the polymeric core can also have an average size of about 25 nm or even about 12 nm. However, the size of the charged polymer-coated core varies according to the number of layers of charged polymer that are layered on the nanoparticle, and whether or not a final protective coating is employed.

In accordance with the present invention, the resultant size of the nanoparticle after deposition of charged polymer layers on the polymer core is typically less than about 1000 nm. Typically the size of the resultant nanoparticle is less than about 500 nm and more typically less than about 300 nm. The size of the particle is related to the performance of the invention. Smaller nanoparticles are less likely to settle out of a recording medium over a period of time and provide greater stability. In addition, the nanoparticles must be capable of ejection through small orifices for applications such as ink jet printers, therefore nanoparticles in a smaller range are preferred. Furthermore, smaller nanoparticles provide for greater durability in textile printing applications due to the increased surface area of the nanoparticles, which enhances the adherence of the nanoparticle to the textile. Nanoparticles can comprise any shape, such as, for example, spheres, crystals, rods, discs, tubes, and the like.

The term "charged polymer" or the term "polyelectrolyte" are, in general, used interchangeably herein to include, without limitation any polymer or oligomer that is charged. Therefore, this term includes any polymer comprising an electrolyte, that is, a polymer comprising formal charges and its associated counter ions, the identity and selection of which will be well known to one of ordinary skill in the art. However, this term is also used to include polymers that can be induced to carry a charge by, for example, adjusting the pH of their solutions. For example, the charged polymer poly(butyl acrylate-methacryloxyethyl) trimethylammonium bromide is included in the use of the term "charged polymer", as is the polymer poly[N,N'-bis(2,2,6,6-tetramethyl-4-piperidinyl)-1,6-hexanediamine-co-2,4-dichloro-6-morpholino-1,3,5-triazine] which can readily be protonated so that it becomes charged. Additional terms "polyelectrolyte-polymer", "colorless charged polymer", "colorless polyelectrolyte", "void charged polymer", "void polyelectrolyte", or "transparent charged polymer", and so forth, are used herein to refer to a charged polymer. These terms are used to distinguish a charged polymer that does not comprise a colorant associated therewith, from one that does. Examples of polycations used herein are polyethyleneimine permethylated perbromide and poly(2-methacryloxyethyltrimethylammonium bromide). Examples of polyanions used herein are poly(vinyl sulfonic acid, sodium salt) and poly (styrene sulfonic acid, sodium salt).

Any charged polymer can be used that has a positive charge, a negative charge, or can be induced to carry a positive or negative charge by, for example, adjusting the pH of their solutions. Suitable charged polymers with positive charge include but are not limited to polyethyleneimines of less than about 5,000 molecular weight ($M_W$). More preferable are polyethyleneimines of from about 1000 molecular weight to about 2000 molecular weight. Most preferable are poly(ethyleneimines) and methylated derivatives thereof, of about 1200 $M_W$ and 1800 $M_W$. Suitable polymers and methylated polymers with a positive charge (polycations) also include but are not limited to poly(2-butylmethacryloxyethyltrimethylammonium bromide). Suitable polymers with a negative charge (polyanions) include but are not limited to poly(styrenesulfonic acid), poly(vinylsulfonic acid), polyethylene imine permethylated perbromide, and salts (for example, sodium salts) thereof The term "zeta potential" is used herein to mean without limitation a potential gradient that arises across an interface. This term especially refers to the potential gradient that arises across the interface between the boundary layer in contact with the nanoparticle of the present invention and the moveable diffuse layer in which the nanoparticle is suspended. Zeta potential measurements were taken using a Zetapals Instrument (Brookhaven Instrument Corporation, Holtsville, N.Y.), by adding 1–3 drops of sample into a cuvet containing 1 mM KCl solution, using the instrument's default functions preset for aqueous solutions.

The polymeric core and/or the charged polymer coatings can have an agent or "functional agent" disposed within the polymer. Typically, the agent is dispersed throughout the polymer. "Agents" or "functional agents" for the purposes of this invention, are compositions capable of providing a functional or aesthetic benefit and can include, for example, colorants, colorant stabilizers, UV absorbers, and various functional additives.

As used herein, the term "colorant" is meant to include, without limitation, any material which typically will provide tint or color to a substrate. The term is meant to include a single material or a mixture of two or more materials. Suitable colorants for use in the present invention include, but are not limited to, dyes and pigments. The colorant can be an organic dye. Organic dye classes include, by way of illustration only, triarylmethyl dyes, such as Malachite Green Carbinol base {4-(dimethylamino)-α-[4-(dimethylamino)phenyl]-α-phenyl-benzene-methanol}, Malachite Green Carbinol hydrochloride {N-4-[[4-(dimethylamino)phenyl]phenyl-methylene]-2,5-cyclohexyldien-1-ylidene]-N-methyl-methanaminium chloride or bis[p-(dimethylamino)phenyl]phenylmethylium chloride}, and Malachite Green oxalate {N-4-[[4-(dimethylamino)-phenyl]-phenylmethylene]-2,5-cyclohexyldien-1-ylidene]-N-methyl-methanaminium chloride or bis[p-(dimethylamino)-phenyl] phenylmethylium oxalate}; monoazo dyes, such as Cyanine Black, Chrysoidine [Basic Orange 2; 4-(phenylazo)-1,3-benzenediamine monohydrochloride], Victoria Pure Blue BO, Victoria Pure Blue B, basic fuschin and β-Naphthol Orange; thiazine dyes, such as Methylene Green, zinc chloride double salt [3,7-bis(dimethylamino)-6-nitrophenothiazin-5-ium chloride, zinc chloride double salt]; oxazine dyes, such as Lumichrome (7,8-dimethylalloxazine); naphthalimide dyes, such as Lucifer Yellow CH {6-amino-2-[(hydrazinocarbonyl)amino]-2,3-dihydro-1,3-dioxo-1H-benz[de]iso-quinoline-5,8-disulfonic acid dilithium salt}; azine dyes, such as Janus Green B {3-(diethylamino)-7-[[4-(dimethyl-amino)phenyl]azo]-5-phenylphenazinium chloride}; cyanine dyes, such as Indocyanine Green {Cardio-Green or Fox Green; 2-[7-[1,3-dihydro-1,1-dimethyl-3-(4-sulfobutyl)-2H-benz[e]indol-2-ylidene]-1,3,5-heptatrienyl]-1,1-dimethyl-3-(4-sulfobutyl)-lH-benz[e]indolium hydroxide inner salt sodium salt}; indigo dyes, such as Indigo {Indigo Blue or Vat Blue 1; 2-(1,3-dihydro-3-oxo-2H-indol-2-ylidene)-1,2-dihydro-3H-indol-3-one}; coumarin dyes, such as 7-hydroxy-4-methyl-coumarin (4-methylumbelliferone); benzimidazole dyes, such as Hoechst 33258 [bisbenzimide or 2-(4-hydroxyphenyl)-5-(4-methyl-1-piperazinyl)-2,5-bi-1H-benzimidazole trihydro-chloride pentahydrate]; paraquinoidal dyes, such as Hematoxylin {Natural Black 1; 7,11b-dihydrobenz[b]-indeno[1,2-d]pyran-3,4,6a,9,10(6H)-pentol}; fluorescein dyes, such as Fluoresceinamine (5-aminofluorescein); diazonium salt dyes, such as Diazo Red RC (Azoic Diazo No. 10 or Fast Red RC salt; 2-methoxy-5-chlorobenzenediazonium chloride, zinc chloride double salt); azoic diazo dyes, such as Fast Blue BB salt (Azoic Diazo No. 20; 4-benzoylamino-2,5-diethoxybenzene diazonium chloride, zinc chloride double salt); phenylenediamine dyes, such as Disperse Yellow 9 [N-(2, 4-dinitrophenyl)-1,4-phenylenediamine or Solvent Orange 53]; diazo dyes, such as Disperse Orange 13 [Solvent Orange 52; 1-phenylazo-4-(4-hydroxyphenylazo)-naphthalene]; anthra-quinone dyes, such as Disperse Blue 3 [Celliton Fast Blue FFR; 1-methylamino-4-(2-hydroxyethylamino)-9,10-anthraquinone], Disperse Blue 14 [Celliton Fast Blue B; 1,4-bis(methylamino)-9,10-anthraquinone], and Alizarin Blue Black B (Mordant Black 13); trisazo dyes, such as Direct Blue 71 {Benzo Light Blue FFL or Sirius Light Blue BRR; 3-[(4-[(4-[(6-amino-1-hydroxy-3-sulfo-2-naphthalenyl)azo]-6-sulfo-1-naphthalenyl)azo]-1-naphthalenyl)azo]-1,5-naphthalenedisulfonic acid tetrasodium salt}; xanthene dyes, such as 2,7-dichloro-fluorescein; proflavine dyes, such as 3,6-diaminoacridine hemisulfate (Proflavine); sulfonaphthalein dyes, such as Cresol Red (o-cresolsulfonaphthalein); phthalocyanine dyes, such as Copper Phthalocyanine {Pigment Blue 15; (SP-4-1)-[29H,31H-phthalocyanato(2-)-$N^{29}$, $N^{30}$,$N^{31}$,$N^{32}$]-copper}; carotenoid dyes, such as trans-β-carotene (Food Orange 5); carminic acid dyes, such as Carmine, the aluminum or calcium-aluminum lake of carminic acid (7-a-D-glucopyranosyl-9, 10-dihydro-3,5,6,8-tetrahydroxy-1-methyl-9, 10-dioxo-2-anthracene-carbonylic acid); azure dyes, such as Azure A [3-amino-7-(dimethylamino)phenothiazin-5-ium chloride or 7-(dimethyl-amino)-3-imino-3H-phenothiazine hydrochloride]; and acridine dyes, such as Acridine Orange [Basic Orange 14; 3,8-bis(dimethylamino)acridine hydrochloride, zinc chloride double salt] and Acriflavine (Acriflavine neutral; 3,6-diamino-10-methylacridinium chloride mixture with 3,6-acridine-diamine).

Suitable colorants for use in the present invention also include a family of subphthalocyanine compounds having the following general formula:

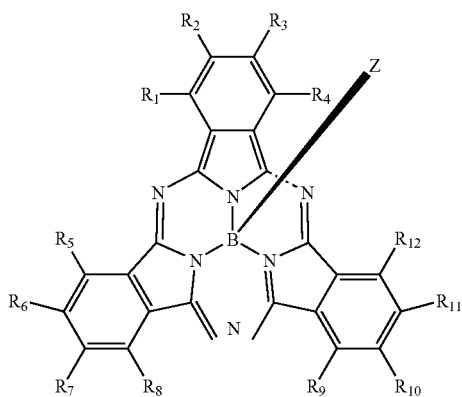

wherein $R_1$ to $R_{12}$ and Z each independently represent —H; a halogen; an alkyl group; a substituted alkyl group; an aryl group; a substituted aryl group; an alkoxide group; a substituted alkoxide group, a phenoxy group; a substituted phenoxy group; an alkyl sulfide; an aryl sulfide; a nitrogen-containing group; a sulfonic acid; a sulfur-containing group; —OR', —NR'R", or —SR', wherein R' and R" each independently represent an alkyl group, a substituted alkyl group, an aryl group, or a substituted aryl group. In accordance with the present invention, $R_1$ to $R_{12}$ each independently represent —H, a halogen, an alkyl group, a nitrogen-containing group, or a sulfur-containing group. Typically, $R_1$ to $R_{12}$ each independently represent —H, chlorine, bromine, fluorine, iodine, a tert-butyl group, —$NO_2$, —$SO_3H$, —$SO_3Na$, —$SO_3Cl$, or —$SO_3^-pyH^+$.

Suitable Z substituents may be selected from a variety of substituents, which provide desirable properties to the resulting subphthalocyanine compound. In accordance with the present invention, Z comprises a moiety which stabilizes the subphthalocyanine compound; a moiety which renders the subphthalocyanine compound water soluble; or a moiety which both stabilizes and renders the subphthalocyanine water soluble. Examples of suitable Z include, but are not limited to, a hydroxyl group; a halogen; an alkyl group; an alkoxy group; an ether group; a polyol group; an aromatic group; a substituted aromatic group; a nitrogen-containing group; a sulfur-containing group; —OR', —NR'R", or —SR', wherein R' and R" each independently represent an alkyl group, a substituted alkyl group, an aryl group, or a substituted aryl group, and so forth. Typically, Z comprises one of the following moieties:

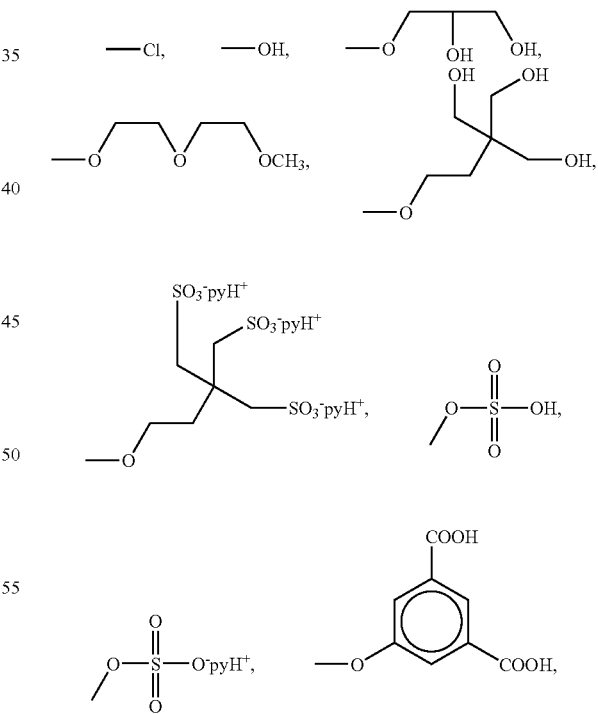

where x is an integer from 3 to 30, and R'" is a hydrogen or an alkyl group having up to six carbon atoms.

Specific examples of subphthalocyanine compounds suitable for use in the present invention include, but are not limited to, the following compounds given below, wherein

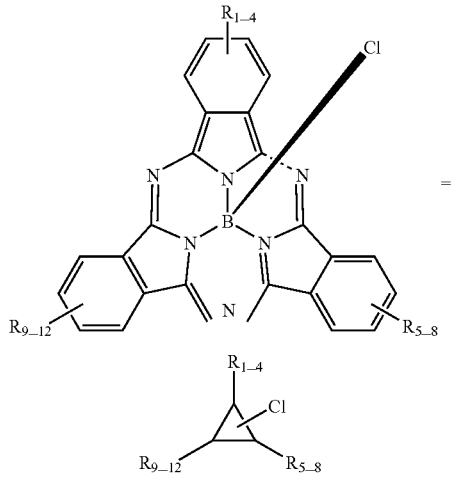

and wherein abbreviations such as $R_{1-4}$ represent the substituents $R_1$ to $R_4$:

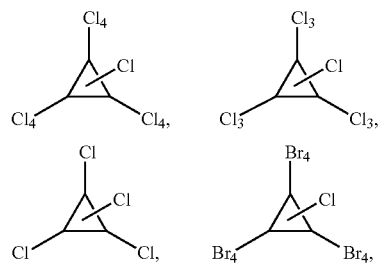

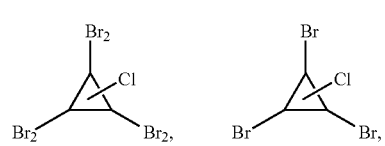

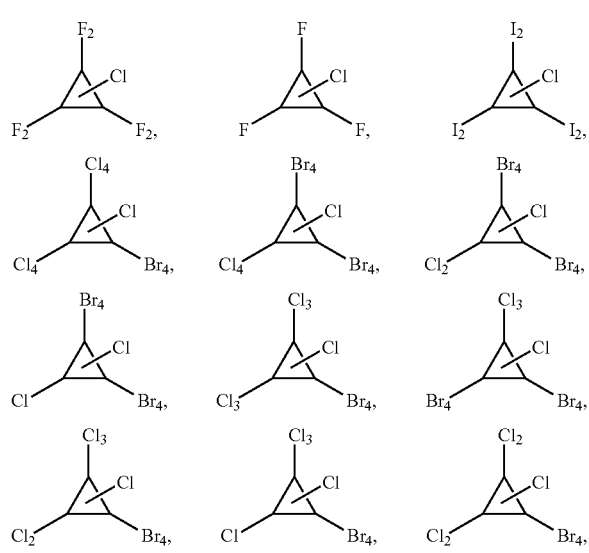

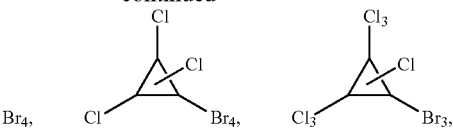

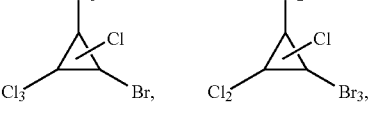

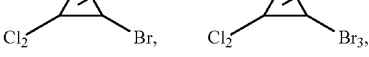

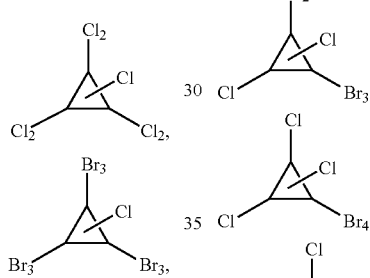

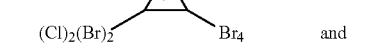

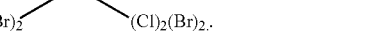

In a further aspect of the present invention, the lightfastness properties of the subphthalocyanine dye may be greatly improved to archival levels by the presence of a perfluorotetraphenylporphine. The present invention encompasses both the physical mix and the covalent attachment of the perfluorotetraphenylporphine and the subphthalocyanine dye. For example, when the subphthalocyanine dye shown below (where $R_1$ to $R_{12}$ are H, and Z is —$OC_6H_3$-3,5-$Me_2$) is physically admixed with copper-meso-perfluorotetraphenylporphine (abbreviated $CuF_{20}TPP$) in a polymer matrix, the absorption ($\lambda_{MAX}$) of the subphthalocyanine dye did not change even after exposure for 10 hours to radiation from an Atlas Suntest CPS+ xenon lamp (R.B. Atlas Inc., Toronto, Canada). Thus, this invention encompasses both the admixture of subphthalocyanine dye and perfluoroporphine such as $CuF_{20}TPP$ and the covalent attachment of these moieties.

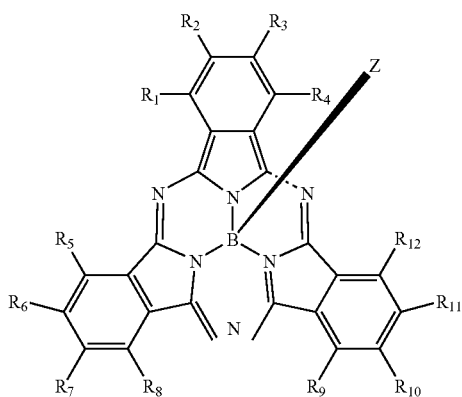

The covalent attachment of the perfluorotetraphenylporphine and the subphthalocyanine dye moieties is represented by the complex shown above, wherein Z comprises a copper-meso-perfluorotetraphenylporphine and a "linker" between the subphthalocyanine dye portion of the molecule and a phenyl ring of porphine. Therefore, in this example, Z can represent —NXCuF$_{19}$TPP, —PXCuF$_{19}$TPP, —AsXCuF$_{19}$TPP, —BXCuF$_{19}$TPP, —OCuF$_{19}$TPP, —SCuF$_{19}$TPP, —CX$_2$CuF$_{19}$TPP, —SiX$_2$CuF$_{19}$TPP, —GeX$_2$CuF$_{19}$TPP, —SnX$_2$CuF$_{19}$TPP, and the like, where X can independently represent H, alkyl, aryl, halide, alkenyl, cycloalkyl, heterocycloalkyl, aryl, heteroaryl, alkoxide, phenoxide, substituted derivatives thereof, and so forth. These complexes are prepared by synthetic methods known to one of ordinary skill in the art. For example, the complex in which Z is —NHCuF$_{19}$TPP was synthesized by reacting the bromo subphthalocyanine with the amino derivative of the perfluroporphine to obtain the subphthalocyanine-NHCuF$_{19}$TPP compound.

Also suitable for use in the nanoparticles of the present invention are two subphthalocyanine compounds reacted with a third reactant to obtain a colorant compound having the following general formula:

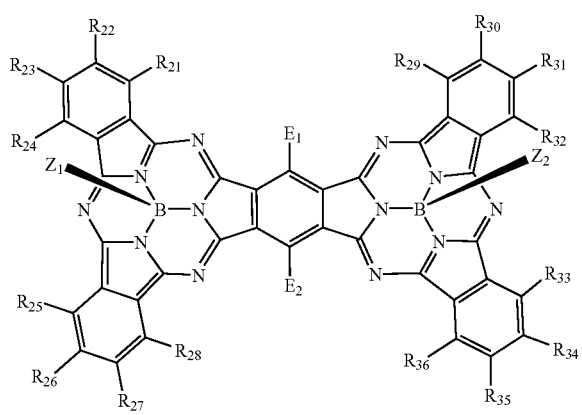

wherein $R_{21}$ to $R_{36}$, $Z_1$, and $Z_2$ each independently represent moieties as described above with respect to $R_1$ to $R_{12}$ and Z. In the formation of the above compound, the third reactant may be selected from 1,3,4,6-tetracyanobenzene or 1,3,4,6-tetracyanobenzene further substituted with one or more electron-withdrawing groups, $E_1$ and $E_2$. Suitable electron-withdrawing groups include, but are not limited to, —NO$_2$.

Charged polymer layers that are used to coat a nanoparticle can incorporate functional additives and colorant stabilizers. The term "colorant stabilizer" is used to refer to compositions that are capable of stabilizing the colorant against degradation by any mechanism. Colorant stabilizers include, but are not limited to, a porphine, a metal, a metal salt, a molecular includant, an ultraviolet radiation stabilizer or absorber, a quencher, a radical scavenger, or a combination thereof. Suitable colorant stabilizers in the form of Porphines are disclosed in U.S. Pat. Nos. 5,885,337; 5,782,963; 5,855,655; and 5,891,229; all of which are assigned to Kimberly-Clark Worldwide, Inc., the entirety of which are incorporated herein by reference. Other suitable colorant stabilizers for use in the present invention include, but are not limited to, colorant stabilizers disclosed in the U.S. patents cited above.

Suitable porphines for use as colorant stabilizers include, but are not limited to, porphines having the following structure:

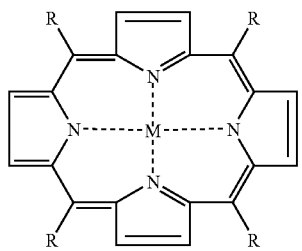

wherein R is any proton-donating moiety and M is iron, cobalt or copper. Typically, R is SO$_3$H,

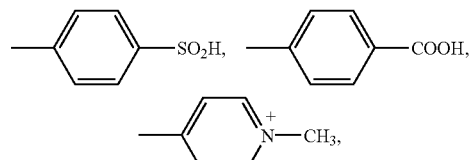

COOH, R$_1$COOH wherein R$_1$ is an alkyl group of from 1 to 6 carbons, or the corresponding salt thereof.

In accordance with the present invention, the colorant stabilizer is represented by one or more porphines such as Cu-meso-tetra-(4-sulfanatophenyl)-porphine (designated CuTPPS4) and Cu-meso-tetra-(N-methyl-4-pyridyl)-porphine (designated CuTMPS4), having the following structure:

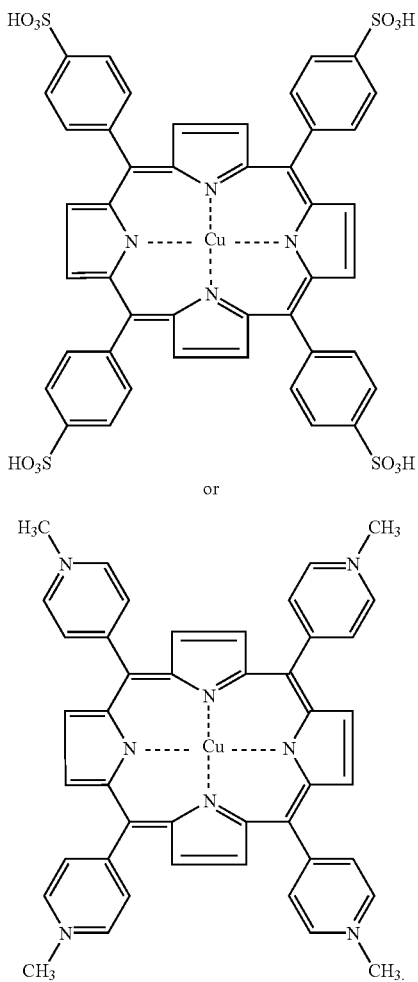

In the above-described porphines, the copper ion can also be substituted with an iron or cobalt. It is also understood that in the case of FeTPPS4, CuTPPS4 or CoTPPS4, the hydrogen ion of the sulfuric acid moieties may be substituted with other cations when in solution, and therefore constitute salts such as sodium salts.

Molecular includants are another form of colorant stabilizers that may be used in the present invention. The term "molecular includant," as used herein, is intended to mean any substance having a chemical structure which defines at least one cavity. That is, the molecular includant is a cavity-containing structure. As used herein, the term "cavity" is meant to include any opening or space of a size sufficient to accept at least a portion of the colorant.

The term "functionalized molecular includant" is used herein to mean a molecular includant to which one or more molecules of a colorant stabilizer are covalently coupled to each molecule of the molecular includant.

The term "derivatized molecular includant" is used herein to mean a molecular includant having more than two leaving groups covalently coupled to each molecule of molecular includant. The term "leaving group" is used herein to mean any leaving group capable of participating in a bimolecular nucleophilic substitution reaction. Examples of molecular includants include, but are not limited to, the cyclodextrins.

Suitable molecular includants can be inorganic or organic in nature. In certain aspects, the chemical structure of the molecular includant is adapted to form a molecular inclusion complex. Examples of molecular includants are, by way of illustration only, clathrates or intercalates, zeolites, and cyclodextrins. Examples of cyclodextrins include, but are not limited to, α-cyclodextrin, β-cyclodextrin, γ-cyclodextrin, δ-cyclodextrin, hydroxypropyl β-cyclodextrin, hydroxyethyl β-cyclodextrin, hydroxyethyl α-cyclodextrin, carboxymethyl α-cyclodextrin, carboxymethyl β-cyclodextrin, carboxymethyl γ-cyclodextrin, octyl succinated α-cyclodextrin, octyl succinated β -cyclodextrin, octyl succinated γ-cyclodextrin and sulfated β-cyclodextrin and sulfated γ-cyclodextrin (Cerestar U.S.A., Inc., Hammond, Ind.).

The term "derivatized cyclodextrin" as used herein means a cyclodextrin having more than two leaving groups covalently coupled to each molecule of cyclodextrin. The term "leaving group" is used herein to mean any leaving group capable of participating in a bimolecular nucleophilic substitution reaction. Examples of derivatized cyclodextrin include, but are not limited to, hydroxypropyl β-cyclodextrin, hydroxyethyl β-cyclodextrin, hydroxyethyl α cyclodextrin, carboxymethyl α cyclodextrin, carboxymethyl β cyclodextrin, carboxymethyl γ cyclodextrin, octyl succinated α cyclodextrin, octyl succinated β cyclodextrin, octyl succinated γ cyclodextrin and sulfated β and γ-cyclodextrin. A useful derivatized cyclodextrin is ethylhydroxy γ-cyclodextrin.

Typical molecular includant used in the present invention include, but are not limited to γ-cyclodextrin and β-cyclodextrin. In other embodiments, the molecular includant is an ethyl hydroxy β-cyclodextrin. Although not wanting to be bound by the following hypothesis, it is believed that the molecular includant inhibits the aggregation of the colorant molecule in solution. Other aggregation inhibitors that can be used in practicing the present invention are starches, pectins, amyloses, clathrates and the crown ethers.

A wide range of other visible light or ultraviolet (UV) screening agents, filters, or absorbers may be used in the present invention, the selection of which will also be apparent to one of ordinary skill in the relevant art. The terms "screening agent", "absorber", or "filter" is used interchangeably herein to mean any substance that absorbs radiation of a desired wavelength, whether that wavelength be in the ultraviolet or visible radiation range. The term is meant to include a single material or a mixture of two or more materials. Thus, ultraviolet filter molecules may be used in the present invention to filter out harmful UV radiation that would fade or decompose the colorant. Examples of suitable ultraviolet radiation absorbers for use in the present invention include, but are not limited to, a family of hydroxybenzophenones (wherein R and R' each independently represent OH, $SO_3Na$, $CO_2Na$, H, alkyl, aryl, halide, alkenyl, cycloalkyl, heterocycloalkyl, aryl, heteroaryl, alkoxide, phenoxide, substituted derivatives thereof, and so forth), as shown below, or a series of benzotriazoles (wherein R and R' each independently represent OH, $SO_3Na$, $CO_2Na$, H, alkyl, aryl, halide, alkenyl, cycloalkyl, heterocycloalkyl, aryl, heteroaryl, alkoxide, phenoxide, substituted derivatives thereof, and so forth), also shown below.

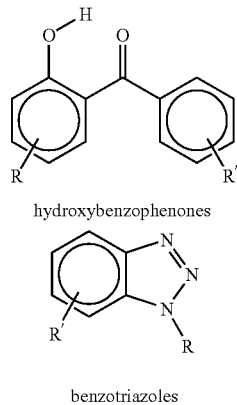

hydroxybenzophenones benzotriazoles

Radical scavengers can serve as colorant stabilizers and include, but are not limited to, triiodophenols and tertiary amines, such as those having the following structure, wherein R and R' each independently represent OH, $SO_3Na$, $CO_2Na$, H, alkyl, aryl, halide, alkenyl, cycloalkyl, heterocycloalkyl, aryl, heteroaryl, alkoxide, phenoxide, substituted derivatives thereof, and so forth.

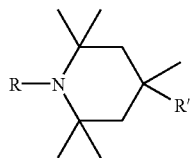

Various quencher molecules can also be used as colorant stabilizers. For example, the following formula represents a suitable quencher species, wherein R and R' each independently represent OH, $SO_3Na$, $CO_2Na$, H, alkyl, aryl, halide, alkenyl, cycloalkyl, heterocycloalkyl, aryl, heteroaryl, alkoxide, phenoxide, substituted derivatives thereof, and so forth.

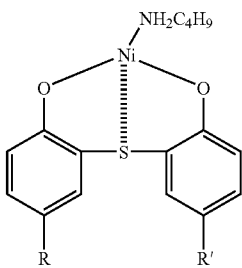

The present invention also encompasses reactive species generators that would produce reactive species such as free radicals when irradiated. These species would be useful when it is desired to react and alter the chromaphore of a colorant and thereby fade the color rapidly allowing for photo decoloration or photoerasing indicators on a substrate.

In another aspect of the present invention, colorant stabilizers can also be in the form of a metal or metal salt, such as a lanthanide or lanthanide salt. Although lanthanides and lanthanide salts are useful metals, other main group or transition metals may also be used in the present invention, alone or in combination, such as magnesium, iron or zinc.

Functional additives that provide certain physical or chemical properties to the nanoparticle can also be incorporated into the charged polymer layers and/or the polymeric core. Suitable functional additives include, but are not limited to, a charge carrier, a thermal oxidation stabilizer, a light-stabilizer, a viscoelastic property modifier, a crosslinking agent, a plasticizer, a charge control additive, a flow control additive, a filler, a surfactant, a metal solubility enhancing agent, a chelating agent, a leuco dye, or combinations thereof. Examples of such additives include, but are not limited to, charge control additives such as a quaternary ammonium salt; flow control additives such as hydrophobic silica, zinc stearate, calcium stearate, lithium stearate, polyvinylstearate, and polyethylene powders; fillers such as calcium carbonate, clay and/or talc; light-stabilizers such as TINUVIN® compounds; among other additives used by those having ordinary skill in the art. Charge carriers are well known to those having ordinary skill in the art and typically are polymer-coated metal particles. Useful surfactants include, but are not limited to, $C_{12}$ to $C_{18}$ surfactants such as cetyl trimethyl ammonium chloride and carboxymethylamylose. Light-stabilizers such as TINUVIN® compounds are a class of compounds produced by Ciba-Geigy Corporation, which includes benzophenones, benzotriazoles and hindered amines. Useful TINUVIN® compounds include, but are not limited to, 2-(2'-hydroxy-3'-sec-butyl-5'-tert-butylphenyl)-benzo-triazole, poly-(N-β-hydroxyethyl-2,2,6,6-tetramethyl-4-hydroxy-piperidyl succinate and 2-(2'-hydroxy-3',5'-ditertbutylphenyl)-5-chlorobenzotriazole. The identities and amounts of such additional components in the colored composition are well known to one of ordinary skill in the art. To improve the solubility of the metal or metal salt in solution, metal solubility-enhancing agents may be added. Useful metal solubility-enhancing agents include, but are not limited to, chelating agents, including, but not limited to, EDTA (ethylenediaminetetraacetic acid) or EGTA (ethylene glycol-bis(β-aminoethyl ether)).

In addition, colorless dyes can be functional additives. By associating a leuco dye or a colorless "pre-dye" on the charged polymer, then adsorbing the charged polymer-dye combination on the nanoparticle, the colorless dye is converted to a colored dye when the nanoparticle is irradiated with UV light. This embodiment can be used in photodevelopment applications.

A final outside layer, comprising a protective stratum of transparent charged polymer, may optionally be added to the nanoparticle. When assembled in this fashion, the final charge of this protective outer layer (zeta potential) is employed to adhere the nanoparticle to the substrate during printing processes. Thus, by matching the nanoparticle charge to the opposite charge of the substrate, strong coulombic forces that augment the van der Waals and other physical and chemical attractions between the nanoparticle and the substrate can be achieved. Examples of protective coatings include, but are not limited to, an outer charged polymer layer comprising the sodium salt of poly(styrenesulfonic acid-co-vinyl alcohol), subsequently crosslinked with a diamine to form a polyamide-coated nanoparticle, or crosslinked with a diol to form a polyester-coated nanoparticle. Also by way of illustration, an outer coating of a charged polymer containing polyhydroxy functional groups could be readily crosslinked by one of the several methods well known to one skilled in the relevant art. In one embodiment, the final protective coat can comprise the sodium salt of poly(styrenesulfonic acid-co-maleic acid) that is exposed to a solution of a diamine which reacts with the poly(styrenesulfonic acid-co-maleic acid) layer, forming an polyamide protective layer which typically encapsulates the entire nanoparticle. A protective layer would be useful, for example, to achieve enhanced oxygen impermeability and protection of the nanoparticle against oxidation and other degradation reactions.

The recording media comprises the nanoparticles present in a carrier, the nature of which is well known to one of ordinary skill in the art. For many applications, the carrier will be a polymer, typically a thermosetting or thermoplastic polymer, with the latter being the more common. Examples of suitable thermosetting and thermoplastic polymers are disclosed in U.S. Pat. No. 5,855,655 cited above. One suitable application is the incorporation of nanoparticles of the present invention into a polymer coating of a heat transfer product, such as is used for transferring graphic images onto clothing. Further examples of carriers include, but are not limited to, various organic solvents, co-solvents, surfactants, or water which are used to form inks comprising the nanoparticles of the present invention.

Another aspect of the present invention is directed towards the recording medium of the present invention containing a nanoparticle having a surface modifier or surface gloss modifying agent disposed upon the particle template. Examples of such surface modifiers include polyvinyl alcohol, polyvinyl pyrrolidone, polyethylene glycol, chitosans, polysiloxanes, polyacrylic acid, polysiloxane polyethylene oxide copolymer, polysiloxane polypropylene oxide copolymer, linear dextrins, cyclodextrins, combinations thereof, or copolymers thereof. The addition of the surface modifiers results in a surface with enhanced properties, such as glossy, matt, dull or textured.

FIG. 1 depicts the formation of a nanoparticle by adding multiple layers of charged polymer onto the polymeric core surface in a sequential fashion. The nanoparticle can comprise a polymeric core that has colorant disposed within or dispersed throughout, or a polymeric core without colorant. The charged polymer layers can be alternating charged polymer-colorant layers and void polyelectrolyte layers that do not comprise a colorant. In another embodiment, various colorants can be incorporated into each charged polymer layer that is adsorbed onto the nanoparticle core. In either case, the colorant in the different charged polymer layers may differ from the colorant in adjacent layers. The layering process can involve an alternation of charged polymer-colorant polymer and charged polymer layers, such that sequential layers produce a nanoparticle that is characterized by opposite, or different, zeta potential charges. This process maintains layer integrity by a variety of chemical and physical forces, including coulombic forces, van der Waals forces and others.

In one aspect of the present invention, the nanoparticles of the recording medium are formed by adding multiple, oppositely-charged or differently-charged layers of charged polymer-colorant and charged polymer onto a charged polymeric core.

Figure 2:
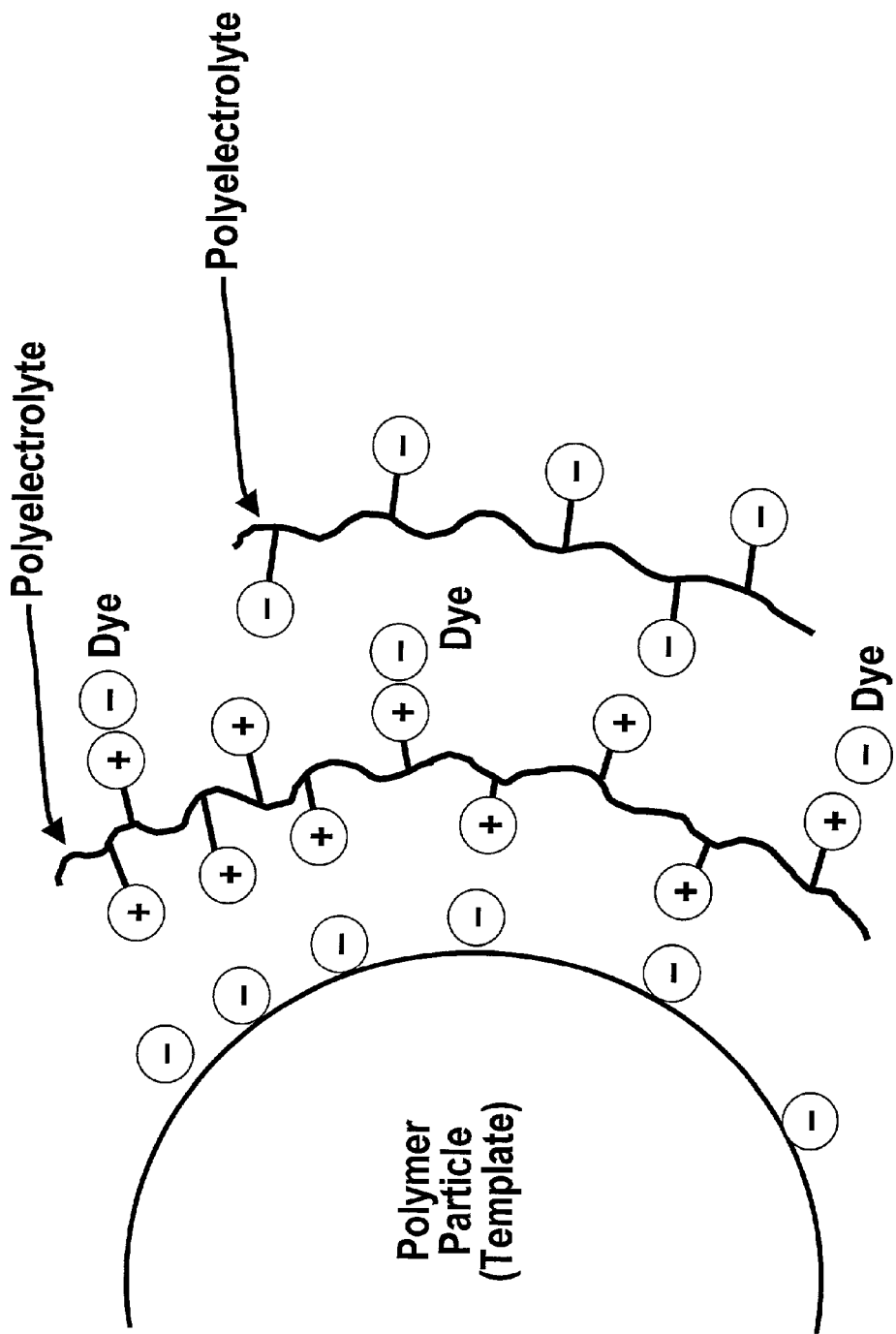
FIG. 2. illustrates one aspect of the present invention, depicting the formation of a nanoparticle by adding multiple layers of alternating charge of charged polymer-colorant and colorless charged polymer onto a nanoparticle template comprising a polymeric core. Among other things, this figure demonstrates how the integrity of the layers is maintained by coulombic forces in addition to van der Waals and other physical and chemical forces, how a final outside layer comprised of a protective stratum of charged polymer may be added to the nanoparticle, and how the coulombic and other forces that increase the stability of the colored nanoparticle provide greater colorfastness of the resultant inks.

FIG. 2. illustrates one aspect of the present invention, depicting the formation of a nanoparticle by adding multiple, layers of alternating charge of charged polymer-colorant and colorless charged polymer onto a nanoparticle template comprising a polymeric core. Among other things, this figure demonstrates how the integrity of the layers is maintained by coulombic, van der Waals forces and others forces, how a final outside layer comprised of a protective stratum of charged polymer may be added to the nanoparticle, and how the coulombic and other forces that increase the stability of the colored nanoparticle provide greater colorfastness of the resultant inks. We note however, that it is not necessary that a nanoparticle that is being formed in this manner exhibit an opposite zeta potential from the polymer charge that is being applied or coated thereto. Thus, the layer-by-layer self-assembly of differently-charged polymers (with or without colorant associated therewith) may be effected in the same way as assembling a nanoparticle with alternately-charged layers.

Figure 3:
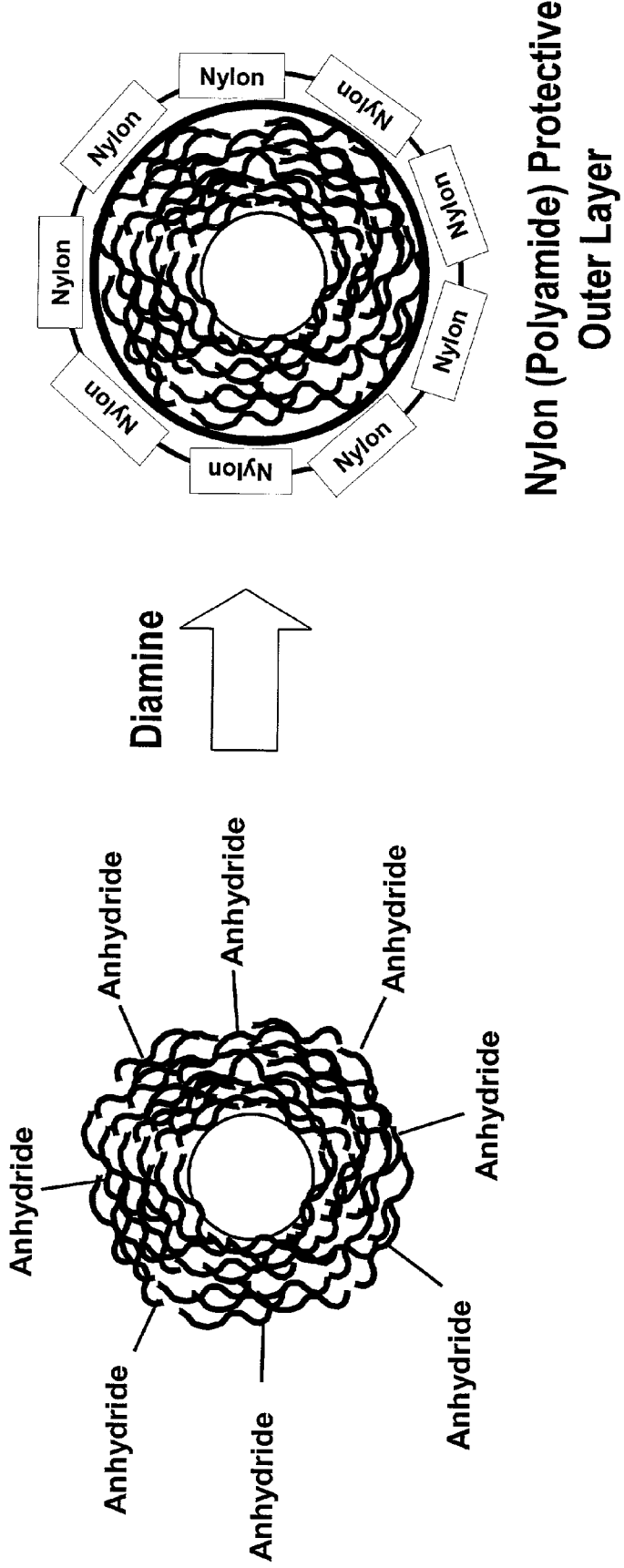
FIG. 3 depicts the formation of final protective coating on a nanoparticle of the present invention by associating a charged polymer comprising a crosslinkable group (here, an anhydride) with the nanoparticle, followed by adding a crosslinking agent (here, a diamine) to form the final protective coating. In the example presented in this figure, the final coating is a polyamide.

In another aspect of the invention, the nanoparticles (illustrated in FIG. 3) of the recording medium comprise a final protective coating on a nanoparticle comprising charged polymer-colorant and charged polymer layered on a polymeric core. This figure is also intended as a general illustration of how multiple levels of colorant protection are achieved, as well as the methods of controlling color intensity and hue. Typically, a nanoparticle can be coated with a final polyeletrolyte layer comprising a protective coating. In one embodiment, the final charged polymer layer comprises a reactive functional group. For example, FIG. 3 illustrates an outer charged polymer layer comprising anhydride groups that can be crosslinked with diamines to form an outer protective layer of nylon.

Surface charges on nanoparticles are utilized in the present invention to adhere the charged polymers to a nanoparticle core, as well as to adhere the assembled nanoparticle to the printing substrate. The presence of surface charges on suspended polymer particles can arise by a variety of phenomena. Possibilities include the presence of various chemical reactions on the surface (e.g. dissociation of functional surface groups), the presence of surface-adsorbed ions, and adsorption or dissociation of charge-bearing molecules. The dissociation of functional surface groups that are charged and/or adsorption of ions are among the most important processes. The surface adsorption of larger molecules containing charged groups such as surfactants and charged polymers of oligomers may also play a vital role. The surface charge of the particles is compensated in the liquid phase by counter ions, thereby ensuring the condition of electrical neutrality in the system as a whole.

The strong coulombic, van der Waals, and other chemical and physical forces between the nanoparticle and the printing substrate are important in providing enhanced stability, durability, and lightfastness. The term "light-fast" is used herein to mean that the colorant, when 5 associated with a charged polymer which itself is associated with a nanoparticle, is more stable to electromagnetic radiation, including, but not limited to, sunlight or artificial light, than when the colorant is not associated with a nanoparticle. In addition, by alternating colorant layers with a protective charged polymer outer sheath layer, lightfastness may be enhanced. Further improvements in lightfastness are obtained by incorporating colorant stabilizers, ultraviolet radiation screening agents, absorbers, or filters in charged polymer layers. Yet further improvements in lightfastness are obtained by coating the nanoparticle with a final charged polymer layer which can be crosslinked upon exposure to a crosslinking agent to form a protective layer. The layer-by-layer self-assembly of alternately-charged, charged polymer-colorant polymer and charged polymer bound to a polymeric core provides the resulting recording medium with enhanced lightfastness, unlimited use of water soluble colorants (containing charge centers), control of color density, and strong substrate bonding via coulombic, van der Waals, and other forces leading to enhanced durability.

The present invention is also directed to recording medium comprising nanoparticles that contain more than one colorant and optionally contain colorant stabilizers. The ability to incorporate colorant both within the nanoparticle polymeric core, and within the charged polymer-colorant polymer coating, provides excellent control over color intensity and hue. In addition, control of color density may also be achieved by adjusting reaction times between the nanoparticle substrate and the charged polymer-colorant where the extent of coating the particle dictates color density. The nanoparticles comprise a charged polymer membrane or coating which prevents colorant degrading materials or reactants from interacting with the colorant. In addition, the nanoparticles may be incorporated into a variety of liquid media to form colorant compositions.

The present invention is further directed to a method of stabilizing a colorant by assembling multiple, alternating layers of charged polymer-colorant and colorless charged polymer on a nanoparticle surface. This method optionally includes the incorporation of ultraviolet radiation screening agents in charged polymer layers and/or coating of the nanoparticle with a final charged polymer layer which can be crosslinked by an appropriate crosslinking agent. In one aspect of the present invention, one or more colorant stabilizers are also incorporated in the charged polymer layers, thereby providing multiple levels of colorant protection from photodegradation mechanisms.

In one aspect of the present invention, the nanoparticles of the recording medium comprise an organic polymeric core that is already colorant-loaded, i.e. having a colorant dispersed throughout it, up to about 30% colorant by weight. This invention is further directed to organic polymeric cores that have up to about 20% colorant by weight, and further, up to about 15% by weight. Nanoparticles comprising polymeric cores are typically formed in a two phase oil/water emulsion system by high shear emulsification using a microfluidizer. The resultant nanoparticles are then coated with charged polymer layers, in which some of the charged polymer has another colorant complexed with it.

The present invention is also directed to methods and compositions that stabilize a recording medium from the effects of sunlight and artificial light, and from the deleterious effects of humidity, oxygen, and other gaseous reactants such as $O_3$, $SO_2$, and $NO_2$. In another aspect of this invention, a protective stratum of transparent charged polymer, may be added to the nanoparticle after it has been coated with alternating charged polymer-colorant, colorless charged polymer layers, for additional colorant protection and stability. In yet another aspect of the present invention, further protection is achieved by incorporating ultraviolet radiation absorbers in charged polymer layers, especially outer charged polymer layers. Yet further enhancements in colorant protection and stability are obtained by coating the nanoparticle with a final charged polymer layer which can be crosslinked upon exposure to an appropriate crosslinking agent, as outlined above for the aspect in which an outer protective layer is formed.

Although not wanting to be limited by the following hypothesis, it is theorized that, in addition to the protection provided by the polymeric coating on the nanoparticle, the above colorant stabilizing compounds act by quenching the excited state of a colorant molecule within the nanoparticle by efficiently returning it to a ground state. This quenching process reduces the likelihood of an oxidative or other chemical reaction occurring which would render the colorant chromophore colorless.

The quenching effect can occur by a number of processes. One such process is referred to as the heavy atom effect (internal or external) in which atoms with a high atomic number, such as iodine and/or lanthanides, can effect the excited electronic transitions of the colorant molecule by allowing heretofore forbidden electronic transitions to occur and by decreasing the excited state lifetimes. This effect permits the rapid return of the colorant to its ground state. Another quenching process involves back electron transfer. In this case, quenching of the excited colorant molecule occurs through sequential electron transfer. The additive or quencher, and colorant form an ion pair through electron donation within which back electron transfer leads to an overall deactivation of the excited energy donor, i.e., the colorant. Another quenching process involves a condition in which the quencher (additive) molecule has an excited energy state lower than the excited colorant. In this case, it may be possible to transfer the excited energy to the quencher thereby allowing the colorant molecule to return to its ground state. These mechanisms are more fully discussed in *Chemistry and Light*, Suppan, P., Published by The Royal Society of Chemistry, 1994, pgs 65–69 which is incorporated herein by reference.

In some aspects of the present invention, the colorant and/or colorant stabilizer of the nanoparticle is associated with a molecular includant. The term "associated" in its broadest sense means that the colorant and/or colorant stabilizer is at least in close proximity to the molecular includant. For example, the colorant and/or colorant stabilizer may be maintained in close proximity to the molecular includant by hydrogen bonding, van der Waals forces, or the like. In one embodiment, the colorant and/or colorant stabilizer may be covalently bonded to the molecular includant. As a further example, the colorant and/or colorant stabilizer may be at least partially included within the cavity of the molecular includant.

The present invention encompasses recording media such as ink jet inks comprising the nanoparticles disclosed herein. Inks used in ink jet printers are described in U.S. Pat. No. 5,681,380, assigned to Kimberly-Clark Worldwide, Inc., which is incorporated herein by reference in its entirety. Ink jet inks will usually contain water as the principal solvent, preferably deionized water in a range of between about 20 to about 95 percent by weight, various co-solvents in an amount of between about 0.5 and about 20 percent by weight, and the nanoparticles of the present invention.

Various co-solvents may be included in the ink formulation. Examples of such co-solvents include a lactam such as N-methyl pyrrolidone. However, other examples of optional co-solvents include N-methylacetamide, N,N-dimethylacetamide, N-methylmorpholino-N-oxide, N-methyl formamide, propyleneglycol-monomethylether, tetramethylene sulfone, and tripropyleneglycolmonomethylether. Still other solvents which may be used include propylene glycol and triethanolamine (TEA). If an acetamide-based cosolvent is also included in the formulation it is typically present at about 5 percent by weight, within a range of between about 1.0–12 percent by weight.

Optionally, one or more humectants in an amount between about 0.5 and 20 percent by weight may be included in the ink formula. Further, other co-solvents in an amount of between about 1.0 and about 7.0 percent by weight may be added to the formulation. Additional humectants for optional use in the formulation include, but are not limited to, ethylene glycol, diethylene glycol, glycerine, and polyethylene glycol 200, 400, and 600, propane 1,3 diol, other glycols, a propyleneglycolmonomethyl ether, such as Dowanol PM (Gallade Chemical Inc., Santa Ana, Calif.), polyhydric alcohols, or combinations thereof.

Other additives may also be included to improve ink performance, such as a chelating agent to sequester metal ions that could become involved in chemical reactions that could spoil the ink over time, for example for use with metal complex dyes, a corrosion inhibitor to help protect metal components of the printer or ink delivery system, a biocide or biostat to control unwanted bacterial, fungal, or yeast growth in the ink, and a surfactant to adjust the ink surface tension. However, the use of a surfactant may be dependent on the type of printhead to be used. If a surfactant is included, it is typically present in an amount of between about 0.1 to about 1.0 percent by weight. If a corrosion inhibitor is included, it is typically present in an amount between about 0.1 and about 1.0 percent by weight. If a biocide or biostat is included, it is typically present in an amount between about 0.1 and about 0.5 percent by weight.

If a biocide or biostat is added to the ink formulation, it may be exemplified by Proxel GXL from Zeneca Corporation of Wilmington, Del. Other examples include Bioban DXN from Angus Chemical Company of Buffalo Grove, Ill. If a corrosion inhibitor is added to the formulation, it may be exemplified by Cobratec available from the PMC Specialty Group Distributing of Cincinnati, Ohio. Alternate corrosion inhibitors include sodium nitrite, triethanolamine phosphate, and n-acyl sarcosine. Still other examples include benzotriazole from Aldrich. If a surfactant is included in the formulation, it is typically a nonionic surfactant exemplified by Surfynol 504 available from Air Products and Chemicals, Inc. of Allentown, Pa. Still other examples include Surfynol 465, and Dynol 604 also available from Air Products. If a chelating agent is included in the formulation it may be exemplified by an ethylene diaminetetraacetic acid (EDTA). Other additives such as pH stabilizers/buffers, (such as citric acid and acetic acid as well as alkali metal salts derived therefrom), viscosity modifiers, and defoaming agents such as Surfynol DF-65, may also be included in the formulation, depending on the product application.

The recording media or colorant compositions of the present invention may be applied to any substrate to impart a color to the substrate. The substrates to which the nanoparticles may be applied include, but are not limited to, paper, wood, a wood product or composite, woven fabric, nonwoven fabric, textile, plastic, glass, metal and the like. Examples of suitable substrates are disclosed in U.S. patent application Ser. No. 08/843,410, assigned to Kimberly-Clark Worldwide, Inc., the entire content of which is hereby incorporated by reference. In one aspect of the present invention, nanoparticles are applied to a textile article, such as clothing. A very thin coating having a thickness of about one nanoparticle may be applied to a textile surface.

The nanoparticles of the present invention can provide a method of finely manipulating color density and hue. Unusual or hard to obtain colors can be provided by assembing alternating charged polymer layers with different colorants. For example, a magenta layer followed by a cyan layer would provide a lilac color. Thus by mixing layers of color a uniform recording medium of unusual color would be obtained. Simple mixtures of different colorants would not result in a similar true color, but rather hues and shades of the original component colorants.

Further discussion on nanoparticles, and methods of making nanoparticles may be found in U.S. patent applications Ser. No. 09/969,539, entitled Nanoparticle Based Inks and Methods of Making the Same, filed contemporaneously herewith.

The present invention is further described by the examples which follow. Such examples, however, are not to be construed as limiting in any way either the spirit or scope of the present invention. In the examples, all parts are parts by weight unless stated otherwise.

EXAMPLE 1

Preparation of Organic Polymer Nanoparticles Containing a Subphthalocyanine Dye

Poly(α-methylstyrene) polymer (1 g) was dissolved in xylene solvent (9 g) to which the subphthalocyanine dye "KCSUBP" (0.1 g), shown in the structure below (where $R_1$-$R_2$=H; Z=$OC_6H_3$-3,5-$Me_2$), was added.

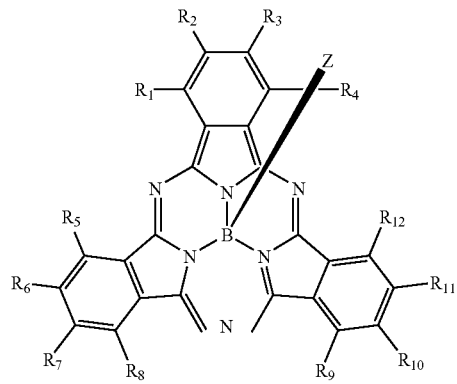

This organic phase was kept at ca. 10–12% wt/wt combined polymer+dye in xylene. The concentration of dye was 9% wt/wt of dye in dye+polymer. Additionally, Texanol® plasticizer (0.05 g, Eastman Chemical Company, Kingsport, Tenn.) was added at a concentration of 5 wt % on the polymer. Ten grams of the organic phase (polymer+solvent) were mixed with 90 grams of the aqueous phase in a narrow glass vessel containing 1.5 wt % surfactant mixture of 50:50 wt/wt of NF-EO20 (Berol 292), 0.675 g; and NF-E06 (Berol 02), 0.675 g (Chemax Inc., Greenville, S.C.); in 88.65 g water.

The solution was subjected to 2 minutes of shearing in an Ultra-Turrax T25 from Janke & Kunkel GMBH at 12,000 rpm followed by 2 minutes of homogenization in a Microfluidizer M110-F homogenizer from Microfluidics International Corporation (Newton, Mass.). The air pressure was kept at 5 bars giving an approximate pressure of 650 bars in the reaction chamber and a flow of 800 m/min. A water bath at 25° C. was used to cool the interaction chamber of the Microfluidizer. The emulsion was further cooled with ice directly after treatment in the Microfluidizer.

The solution was filtered through a serum exchange cell with a pore size of 220 nm. The organic solvent was removed by means of dialysis. Dialysis tubes with a cut off value of 12,000–14,000 were used. The dialysis liquid consisted of 1 M sodium xylene sulfonate. The dialysis liquid was changed four times with at least 8 hours equilibrium time. The fourth time only, surfactant was present in the dialysis liquid, such that the dialysis liquid consisted of 1 M sodium xylene sulfonate+1.5% wt surfactant mixture NF-EO20 (Berol 292) and NF-E06 (Berol 02) (Chemax Inc., Greenville, S.C.). The dialysis liquid was stirred with a magnetic stirrer during the dialysis. After dialysis, a highly-colored suspension of nanoparticles was obtained.

EXAMPLE 2

Preparation of Organic Polymer Nanoparticles Containing Various Dyes

The preparation of a dye-containing nanoparticle was undertaken as described in Example 1, using chlorinated polyisoprene polymer in place of poly(α-methylstyrene) polymer to afford a dye-containing nanoparticle. Mixtures of poly(α-methylstyrene) and chlorinated polyisoprene polymers could also be used. Similarly, the preparation of a dye-containing nanoparticle was undertaken as described in Example 1, using Unigraph red 1971 and/or Uniplas red 1458 dyes (United Color Manufacturing, Inc., Philadelphia, Pa.), in place of the subphthalocyanine dye, to afford a dye-containing nanoparticle. In each case, after dialysis, a colored suspension of nanoparticles was obtained.

EXAMPLE 3

Preparation of Organic Polymer Nanoparticles Comprising Polyvinyl Alcohol and Sudan III The preparation of a dye-containing nanoparticle was undertaken as described in Example 1, using polyvinyl alcohol polymer. Thus, nanoparticles were produced by using 50,000–70,000 molecular weight ($M_n$) polyvinyl alcohol polymer in the two phase oil/water emulsion system described above. Sudan III dye was incorporated into the nanoparticle system by dissolving it in the oil phase (toluene) along with the preformed polyvinyl alcohol polymer, and then mixing oil phase with a water/surfactant phase. High shear mixing was accomplished using a microfluidizer (Model 110F, Microfluidics Corp., Newton, Mass.) to form nanoparticles from about 21 to about 29 nm in diameter. Using this method, nanoparticles containing from about 1% wt/wt up to about 15% wt/wt dye were prepared.

EXAMPLE 4

Preparation of Charged Polymer-Rhodamine B-Coated Organic Polymer Nanoparticles A sample of Sudan III dye was dissolved in polymethylstyrene and formed into nanoparticles in an oil/water system by high shear emulsification, by the method described in Example 1. The resultant polymer-dye nanoparticles averaged approximately 20 nm in diameter. These nanoparticles were then coated with charged polymer containing a Rhodamine B dye, specifically, a sufficient amount of poly (styrene sulfonic acid) salt with Rhodamime B dye in deionized water to coat the particle. After stirring this mixture for approximately 20 min, the sample was placed in a dialysis bag overnight (ca. 16 h) with water as the partition to remove any unassociated poly(styrene sulfonic acid). After dialysis, an intensely-colored suspension of nanoparticles was obtained.

EXAMPLE 5

Preparation of Organic Polymer Nanoparticles Containing High Subphthalocyanine Dye Concentrations To prepare nanoparticles with high dye concentrations, the compatibility of KCSUBP with poly(α-methylstyrene) and chlorinated polyisoprene was examined. The dye concentration was kept at 1% by weight on xylene while the dye concentration on the polymer was increased to 27% by weight in the presence of 5% by weight Texanol™. It was found that the chlorinated polyisoprene crystallized at 9% by weight dye in the presence of 1–10% by weight Texanol®. The poly(α-methylstyrene) formed a homogenous smooth layer at 27% by weight dye in the presence of 5% by weight Texanol® as observed from AFM (atomic force microscopy), indicating the compatibility of KCSUBP with poly (α-methylstyrene) at this high concentration, and the dye being substantially dispersed throughout the polymer. After dialysis, an intensely-colored suspension of nanoparticles was obtained.

EXAMPLE 6

Preparation of Organic Polymer Nanoparticles Containing a Subphthalocyanine Dye and a Porphine Colorant Stabilizer A mixture of 1 g of poly(α-methylstyrene), 0.1 g of the subphthalocyanine dye KCSUBP, 0.1 g of the colorant stabilizer $CuF_{20}TPP$, and 0.05 g of Texanol were dissolved in 9 g of xylene solvent. Organic polymer nanoparticles containing dye and stabilizer were prepared from this mixture according to the experimental details of Example 1, using 90 g of an aqueous phase containing NF-EO20 (Berol 292), 0.675 g; and NF-E06 (Berol 02), in 88.65 g water. After dialysis, a colored suspension of nanoparticles was obtained. The concentration of the $CuF_{20}TPP$ stabilizer was varied from 0.01 g to 0.10 g to provide both low concentration and high concentration stabilizer solutions for lightfastness tests.

EXAMPLE 7

Preparation of Organic Polymer Nanoparticles Containing No Dye

For technical comparisons, nanoparticles of poly(α-methylstyrene) were prepared according to the method of the present inventin. A sample of poly(α-methylstyrene) polymer (ca. 1 g) was dissolved in xylene solvent (ca. 9 g), but no dye was added to solution. Organic polymer nanoparticles of this polymer were prepared according to the experimental details of Example 1. Zeta potential measurements were taken using a Zetapals Instrument (Brookhaven Instrument Corporation, Holtsville, N.Y.), by adding 1–3 drops of sample into a cuvet containing 1 mM KCl solution, using the instrument's default functions preset for aqueous solutions. The zeta potential for these particles was measured at −10 mV. These nanoparticles could be coated with charged polymer-dye and colorless charged polymer as indicated in the specification.

EXAMPLE 8

Lightfastness Study of Nanoparticles Containing a Subphthalocyanine Dye with and without a Porphine Colorant Stabilizer An examination of the lightfast properties of poly(α-methylstyrene) nanoparticles containing the subphthalocyanine dye KCSUBP in the presence of a range of concentrations of the colorant stabilizer copper-meso-perfluorotetraphenylporphine (abbreviated $CuF_{20}TPP$) was undertaken. Thus, the $CuF_{20}TPP$ colorant stabilizer and the subphthalocyanine dye KCSUBP were admixed. Data from this study are provided in Table 1, where absorptions are reported at $\lambda_{MAX}$ before and after exposure to the Atlas Suntest CPS+xenon lamp (R.B. Atlas Inc., Toronto, Canada) radiation over time. As these data indicate, the lightfast properties of the subphthalocyanine dye are greatly improved to archival levels by the presence of $CuF_{20}TPP$.

TABLE 1

Absorption Values at Times $T_{MIN}$ for Poly($\alpha$-methylstyrene) Nanoparticles Containing a Subphthalocyanine Dye with and without a Porphine Colorant Stabilizer

| Sample (in poly-α-methylstyrene) | $T_0$ | $T_{120}$ | $T_{330}$ | $T_{450}$ | $T_{570}$ |
|---|---|---|---|---|---|
| KCSUBP | 2.60 | 2.60 | 2.00 | 1.96 | 1.71 |
| KCSUBP + $CuF_{20}TPP$ (low concentration) | 2.04 | 2.04 | 2.04 | 2.04 | 2.01 |
| KCSUBP + $CuF_{20}TPP$ (high concentration) | 2.93 | 2.93 | 2.93 | 2.93 | 2.93 |
| $CuF_{20}TPP$ | 0.57 | 0.57 | 0.53 | 0.50 | 0.47 |

EXAMPLE 9

Nanoparticles Containing a Subphthalocyanine Dye Covalently Attached to a Porphine Colorant Stabilizer The covalent attachment of a porphine colorant stabilizer to the subphthalocyanine would result in a dye with truly archival properties. Thus, the following compound can be synthesized by reacting the bromo subphthalocyanine with the amino derivative of the perfluoroporphine, to obtain the structure shown below, where Z is —$NHCuF_{19}TPP$. In addition, the substituent Z in the following structure can also represent —$NXCuF_{19}TPP$, —$PXCuF_{19}TPP$, —$AsXCuF_{19}TPP$, —$BXCuF_{19}TPP$, —$OCuF_{19}TPP$, —$SCuF_{19}TPP$, —$CX_2CuF_{19}TPP$, —$SiX_2CuF_{19}TPP$, —$GeX_2CuF_{19}TPP$, —$SnX_2CuF_{19}TPP$, and the like, where X can independently represent H, alkyl, aryl, halide, alkenyl, cycloalkyl, heterocycloalkyl, aryl, heteroaryl, alkoxide, phenoxide, substituted derivatives thereof, and so forth.

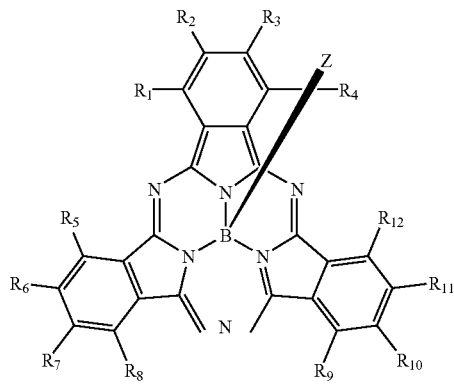

EXAMPLE 10

Stability of Styrene Nanoparticles

The stability of a suspension of styrene nanoparticles on standing in 1 mM aqueous KCl was examined by light scattering size measurements. These measurements were made using a Zetapals Instrument (Brookhaven Instrument Corporation, Holtsville, N.Y.), by adding 1–3 drops of sample into a cuvet containing 1 mM KCl solution, using standard procedures. Data are reported for poly($\alpha$-methylstyrene) nanoparticles containing the subphthalocyanine dye KCSUBP, with and without the colorant stabilizer $CuF_{20}TPP$, and are compared to a polystyrene nanoparticle containing neither colorant nor stabilizer. These results are provided in Table 2.

TABLE 2

Nanoparticle Size on standing in 1 mM aqueous KCl for 2 Hours

| Sample | Size (nm), 0 min | Size (nm), 120 min |
|---|---|---|
| KCSUBP | 98.8 | 98.8 |
| KCSUBP + $CuF_{20}TPP$ | 247.3 | 54.4 |
| poly(α-methylstyrene) control | 102.3 | 63.3 |

The decrease in particle size of the KCSUBP +$CuF_{20}TPP$ and the poly($\alpha$-methylstyrene) control samples reflects the system adjusting itself toward a minimal interfacial area between the dispersed phase and the dispersion medium. The conditions of surfactant/solvents allow the particles to adjust themselves to the optimum interfacial area which, for this system, would appear to be around 54–98 nm. This phenomenon is called "Ostwald ripening".

EXAMPLE 11

Colored Styrene Nanoparticle Lightfastness on Uncoated Cotton Fabric

Suspensions of styrene nanoparticles from Examples 1 (containing KCSUBP) and 6 (containing KCSUBP+ $CuF_{20}TPP$) were prepared, and swatches of uncoated cotton fabric (ca. 1 inch×2 inches) were dipped into each suspension. Each swatch was dried in a vacuum oven under gentle heating, and then exposed to a Atlas Suntest CPS+ xenon lamp radiation, method 13 (R.B. Atlas Inc., Toronto, Canada). Over time, the samples that were treated with the subphthalocyanine dye KCSUBP without colorant stabilizer faded considerably faster than the sample treated with the subphthalocyanine dye KCSUBP with colorant stabilizer $CuF_{20}TPP$ present.

It should be understood that the foregoing relates only to certain disclosed embodiments of the present invention and that numerous modifications or alterations may be made therein without departing from the spirit and scope of the invention as set forth in the appended claims.

What is claimed is:

1. A recording medium comprising:
   a nanoparticle having a size of less than about 1000 nanometers comprising a polymeric core having at least one colorant disposed on the surface of the core and at least one charged polymer layer disposed on and covering the core; and
   a carrier, and wherein the polymeric core has a functional agent disposed therein.

2. The recording medium of claim 1, wherein the polymeric core comprises an organic polymer, an inorganic polymer, a semi-organic polymer, a semi-inorganic polymer, an organometallic polymer, or a combination thereof.

3. The recording medium of claim 1, wherein the at least one colorant is within the at least one charged polymer layer.

4. The recording medium of claim 1, wherein the at least one colorant comprises at least one dye.

5. The recording medium of claim 4, wherein the at least one dye comprises from about 1 to about 30 weight percent to total weight of the nanoparticle.

6. The recording medium of claim 5 wherein the at least one dye comprises from about 1 weight percent to about 15 weight percent of total weight of the nanoparticle.

7. The recording medium of claim 1, wherein the functional agent comprises a colorant, a colorant stabilizer, a functional additive, or a combination thereof.

8. The recording medium of claim 7, wherein the functional additive is a charge carrier, a thermal oxidation stabilizer, a viscoelastic property modifier, a cross-linking agent, a plasticizer, a charge control additive, a flow control additive, a filler, a surfactant, a chelating agent, a leuco dye, or a combination thereof.

9. The recording medium of claim 7, wherein the colorant stabilizer is a porphine, a metal, a metal salt, a molecular includant, an ultraviolet radiation stabilizer, a reactive species generator, a photoinitiator, a quencher, a radical scavenger, or a combination thereof.

10. The recording medium of claim 1, wherein the at least one charged polymer layer comprises a plurality of charged polymer layers.

11. The recording medium of claim 10, wherein at least one of the plurality of charged polymer layers further comprises at least one colorant.

12. The recording medium of claim 11, wherein the colorant is dispersed throughout at least one of the charged polymer layers.

13. The recording medium of claim 11, wherein the colorant is the same as or differs from the colorant of any charged polymer layer adjacent thereto.

14. The recording medium of claim 11, wherein the at least one colorant charged polymer layer has at least one void charged polymer layer adjacent thereto.

15. The recording medium of claim 14, wherein at least one void charged polymer layer is disposed between adjacent colorant charged polymer layers.

16. The recording medium of claim 1, wherein the at least one charged polymer layer comprises a ultraviolet radiation screening agent, a colorant stabilizer, or a combination thereof.

17. The recording medium of claim 1, wherein the nanoparticle further comprises a surface modifying layer disposed on and covering the polymeric core.

18. The recording medium of claim 17, wherein the surface modifying layer comprises an agent selected from the group consisting of polyvinyl alcohol, polyvinyl pyrrolidone, polyacrylic acid, polysiloxane, polysiloxane polyethylene oxide copolymer, polysiloxane polypropylene oxide copolymer, linear dextrin, cyclodextrins, chitosans, and combinations thereof.

19. The recording medium of claim 1, wherein the at least one charged polymer layer comprises a surface modifier.

20. The recording medium of claim 1, wherein the nanoparticle has a zeta potential of about +20 mV or greater.

21. The recording medium of claim 1, wherein the nanoparticle has a zeta potential of about +50 mV or greater.

22. The recording medium of claim 1, wherein the recording medium is an ink.

23. The recording medium of claim 1, wherein the recording medium is an ink-jet ink.

24. The recording medium of claim 1, wherein the carrier is a liquid or a solid.

25. A recording medium comprising:
a nanoparticle having a size of less than about 1000 nanometers comprising a polymeric core having at least one colorant disposed on the surface of the polymeric core and a protective coating disposed on and covering the polymeric core; and
a carrier, and wherein the polymeric core comprises an organic polymer, an inorganic polymer, a semi-organic polymer, a semi-inorganic polymer, an organometallic polymer or a combination thereof and wherein the at least one colorant comprises at least one dye.

26. The recording medium of claim 25, wherein the dye comprises from about 1 to about 30 weight percent to total weight of the nanoparticle.

27. The recording medium of claim 25, wherein the nanoparticle further comprises at least one charged polymer layer disposed on and covering the core and positioned between the polymeric core and the protective coating.

28. The recording medium of claim 27, wherein the at least one colorant is dispersed throughout the at least one charged polymer layer.

29. The recording medium of claim 28 wherein the nanoparticle further comprises at least one colorant dispersed within the polymeric core.

30. The recording medium of claim 29, wherein the at least one colorant of the at least one charged polymer layer is the same as or differs from the at least one colorant dispersed within the polymeric core.

31. The recording medium of claim 27, wherein the at least one charged polymer layer comprises a ultraviolet radiation screening agent or a colorant stabilizer.

32. The recording medium of claim 27, wherein the at least one charged polymer layer further comprises a surface modifier.

33. The recording medium of claim 25, wherein the nanoparticle further comprises a surface modifying layer disposed on and covering the polymeric core.

* * * * *